United States Patent
Dou et al.

(10) Patent No.: US 12,432,153 B2
(45) Date of Patent: Sep. 30, 2025

(54) DATA TRANSMISSION METHOD AND COMMUNICATION APPARATUS

(71) Applicant: HUAWEI TECHNOLOGIES CO., LTD., Guangdong (CN)

(72) Inventors: Shengyue Dou, Shanghai (CN); Shuri Liao, Shanghai (CN); Yuejun Wei, Shanghai (CN); Kedi Wu, Shanghai (CN); Jingwang Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 359 days.

(21) Appl. No.: 17/965,571

(22) Filed: Oct. 13, 2022

(65) Prior Publication Data

US 2023/0032764 A1 Feb. 2, 2023

Related U.S. Application Data

(63) Continuation of application No. PCT/CN2021/087738, filed on Apr. 16, 2021.

(30) Foreign Application Priority Data

Apr. 16, 2020 (CN) .......................... 202010300860.2

(51) Int. Cl.
  *H04L 12/26* (2006.01)
  *H04L 47/2416* (2022.01)
  *H04L 47/2425* (2022.01)

(52) U.S. Cl.
  CPC ...... *H04L 47/2425* (2013.01); *H04L 47/2416* (2013.01)

(58) Field of Classification Search
  CPC ............. H04L 47/2425; H04L 47/2416; H04L 45/121; H04L 45/302; H04L 47/24;
  (Continued)

(56) References Cited

U.S. PATENT DOCUMENTS 7,805,156 B1 * 9/2010 Allen .................... H04W 76/10
  455/450
10,516,712 B2 * 12/2019 Zhang .................... H04L 65/65
  (Continued)

FOREIGN PATENT DOCUMENTS

CN    1859300 A    11/2006
CN    101184222 A   5/2008
  (Continued)

OTHER PUBLICATIONS

3GPP TS 23.503 V16.4.1, "3rd Generation Partnership Project; Technical Specification Group Services and System Aspects; Policy and charging control framework for the5G System (5GS); Stage 2 (Release 16)," Apr. 2020, 115 pages.
  (Continued)

*Primary Examiner* — Phuongchau Ba Nguyen
(74) *Attorney, Agent, or Firm* — Fish & Richardson P.C.

(57) ABSTRACT

Embodiments of this application disclose example data transmission method; and example communication apparatuses. One example method includes receiving, by a first core network function entity, multi-stream transmission information of a service, where the multi-stream transmission information indicates that the service is transmitted via first split data and second split data. The first core network function entity can then receive, based on the multi-stream transmission information, first quality of service QoS configuration information and second QoS configuration information, where the first QoS configuration information corresponds to the first split data, and the second QoS configuration information corresponds to the second split data. The first core network function entity can then output the first QoS configuration information and the second QoS configuration information.

16 Claims, 9 Drawing Sheets

(58) Field of Classification Search
CPC ............. H04L 47/2441; H04L 65/1016; H04L 65/612; H04L 65/75; H04L 65/80; H04L 65/752; H04L 47/10; H04L 47/30; H04L 47/32; H04L 12/5693; H04W 28/24
See application file for complete search history.

(56) References Cited

U.S. PATENT DOCUMENTS

| | | | | |
|---|---|---|---|---|
| 2011/0317587 | A1* | 12/2011 | Lida | ...................... H04L 49/557 370/254 |
| 2012/0290876 | A1* | 11/2012 | Nortz | ...................... H04L 65/80 709/219 |
| 2014/0122656 | A1* | 5/2014 | Baldwin | ............... H04W 12/08 709/219 |
| 2014/0309033 | A1* | 10/2014 | Perlman | ............. H04N 21/2385 463/31 |
| 2015/0009826 | A1* | 1/2015 | Ma | .................... H04W 28/0268 370/235 |
| 2018/0007103 | A1* | 1/2018 | Levin | ................... H04L 1/0072 |
| 2018/0352305 | A1* | 12/2018 | Bowen | ................... H04L 65/70 |
| 2019/0075308 | A1 | 3/2019 | Wei et al. | |

FOREIGN PATENT DOCUMENTS

| | | |
|---|---|---|
| CN | 103733580 A | 4/2014 |
| CN | 105472659 A | 4/2016 |
| CN | 110062426 A | 7/2019 |
| EP | 1531588 A1 | 5/2005 |
| JP | 2009055369 A | 3/2009 |
| JP | 2015513829 A | 5/2015 |
| JP | 2016131380 A | 7/2016 |
| WO | 2017190329 A1 | 11/2017 |
| WO | 2020007202 A1 | 1/2020 |

OTHER PUBLICATIONS

3GPP TS 23.502 V16.4.0, "3rd Generation Partnership Project; Technical Specification Group Services and System Aspects; Procedures for the 5G System (5GS); Stage 2 (Release 16)," Mar. 2020, 582 pages.

3GPP TS 23.501 V16.4.0, "3rd Generation Partnership Project; Technical Specification Group Services and System Aspects; System architecture for the 5G System (5GS); Stage 2 (Release 16)," Mar. 2020, 430 pages.

3GPP TR 26.928 V16.0.0, "3rd Generation Partnership Project; Technical Specification Group Services and System Aspects; Extended Reality (XR) in 5G (Release 16)," Mar. 2020, 131 pages.

Qualcomm, "XR (eXtended Reality) and 5G for Rel-17 Qualcomm views," 3GPP RAN #84, RP-190836, Newport Beach, Jun. 3-6, 2019, 9 pages.

International Search Report and Written Opinion in International Appln. No. PCT/CN2021/087738, mailed on Jul. 14, 2021, 15 pages (with English translation).

Extended European Search Report in European Appln No. 21789485. 6, dated Jul. 26, 2023, 12 pages.

Huawei et al., "Challenges and potential enhancements for XR and Cloud Gaming," 3GPP TSG RAN WG1 #104b-e, R1-2103390, E-meeting, Apr. 12-20, 2021, 4 pages.

Huawei et al., "Traffic model for XR and Cloud Gaming," 3GPP TSG RAN WG1 #104b-e, R1-2102320, E-meeting, Apr. 12-20, 2021, 17 pages.

Office Action in Japanese Appln. No. 2022-562368, mailed on Oct. 17, 2023, 7 pages (with English translation).

Futurewei et al., "KI #2, New Sol: simultaneous connection with NPN and PLMN with QoS consideration for VIAPA," 3GPP SA WG2 Meeting #1xx, S2-20xxxx, Mar. 11, 2020, 7 pages.

Fan et al., "A Survey on 360° Video Streaming: Acquisition, Transmission, and Display," ACM Computing Surveys, Aug. 2019, 52(4):36 pages.

Office Action in Korean Appln. No. 2022-7039428, mailed on Mar. 11, 2025, 21 pages (with English translation).

* cited by examiner

S406: Bind a first QoS configuration identifier in the first split data, and bind a second QoS configuration identifier in the second split data S407: Send processed first split data and processed second split data S408: Determine, based on the first QoS configuration information and the second QoS configuration information, a first transmission mode of the processed first split data and a second transmission mode of the processed second split data S409: Send the processed first split data in the first transmission mode, and send the processed second split data in the second transmission mode S410: Demodulate and decode the received two streams of split data

FIG. 4B

DATA TRANSMISSION METHOD AND COMMUNICATION APPARATUS

CROSS-REFERENCE TO RELATED APPLICATIONS

This application is a continuation of International Application No. PCT/CN2021/087738, filed on Apr. 16, 2021, which claims priority to Chinese Patent Application No. 202010300860.2, filed on Apr. 16, 2020. The disclosures of the aforementioned applications are hereby incorporated by reference in their entireties.

TECHNICAL FIELD

This application relates to the field of communication technologies, and in particular, to a data transmission method and a communication apparatus.

BACKGROUND

With continuous development of communication technologies, there are more services requiring high-rate and low-latency transmission requirements. For example, with continuous progress and improvement of extended reality (extended reality, XR for short) technologies, related industries have developed vigorously. Nowadays, the extended reality technologies have been widely used in fields closely related to people's production and life, such as education, entertainment, military affairs, medical care, environmental protection, transportation, and public health. Extended reality is a general term for various reality-related technologies, and specifically includes virtual reality (virtual reality, VR for short), augmented reality (augmented reality, AR), and mixed reality (mixed reality, MR for short). An XR service is used as an example. Transmission of the XR service usually requires a high rate and a low latency. Therefore, an existing cell system supports a small quantity of users, failing to meet a system user capacity requirement of a future network. In addition, in a wireless communication system, for example, a 5th generation mobile communication technology (5th generation mobile communication technology, 5G for short) system, a channel capacity fluctuates due to a fluctuation characteristic of a wireless channel. As a result, a packet error rate and a latency of the XR service increase (an increase in the packet error rate causes an increase in a quantity of retransmissions), and a series of problems such as frame freezing, artifacts, and black borders occur in the XR service. This severely affects user experience. Therefore, a data transmission method that can meet a transmission requirement of this type of service and also ensure user experience is urgently needed.

SUMMARY

Embodiments of this application provide a data transmission method and a communication apparatus, to meet high-rate and low-latency transmission requirements of a service, and improve user experience.

According to a first aspect, an embodiment of this application provides a data transmission method, and the method may include:

A first core network function entity receives multi-stream transmission information of a service, where the multi-stream transmission information may indicate that the service is transmitted via first split data and second split data.

The first core network function entity may generate first quality of service QoS configuration information and second QoS configuration information based on the multi-stream transmission information, where the first QoS configuration information corresponds to the first split data, and the second QoS configuration information corresponds to the second split data.

The first core network function entity may output the first QoS configuration information and the second QoS configuration information to another device.

That multi-stream transmission needs to be performed on the service through data splitting may be determined based on receiving the multi-stream transmission information of the service. Therefore, QoS configuration information corresponding to a quantity of pieces of split data may be configured and output, so that different split data corresponds to one QoS configuration, and finally service data splitting and QoS-based transmission are implemented. When the method is applied to a service requiring a high rate and a low latency, it can be ensured that an important part of service data is preferentially ensured, so that a user capacity of the system is improved, and good user experience is ensured.

In a possible implementation, the method further includes:

The first core network function entity generates association information, where the association information may indicate that the first split data and the second split data are associated with the service.

The first core network function entity may output the association information to another device.

A basis may be provided, by configuring and outputting the association information, for another device to identify split data associated with the service.

In a possible implementation, the method further includes:

The first core network function entity generates first receiving indication information, where the first receiving indication information may indicate a sequence of receiving the first split data and the second split data.

The first core network function entity may output the first receiving indication information to another device.

Differentiated receiving of different split data can be implemented by indicating and outputting the sequence of receiving the split data. For example, data with higher importance can be preferentially received. This improves a data transmission effect.

In a possible implementation, the method further includes:

The first core network function entity generates second receiving indication information, where the second receiving indication information may indicate to ignore the first split data and/or the second split data.

The first core network function entity may output the second receiving indication information to another device.

Differentiated receiving of different split data can be implemented by indicating and outputting whether a sequence of receiving one or more streams of split data is ignored. For example, data with lower importance may be ignored for receiving. This increases a system capacity, reduces resource occupation, and further improves the data transmission effect.

In a possible implementation, the first split data is data within a field of view FOV, and the second split data is data outside the field of view FOV.

Split data with different importance may be obtained by distinguishing the split data within the field of view and the split data outside the field of view, to provide better transmission assurance for split data with higher importance.

In a possible implementation, the first split data is base layer data, and the second split data is enhancement layer data.

Split data with different importance may be obtained by distinguishing the base layer from the enhancement layer of the split data, to provide better transmission assurance for split data with higher importance.

In a possible implementation, the first split data is I frame data, I slice data, or I tile data generated during video encoding, and the second split data is P frame data, P slice data, or P tile data generated during corresponding video encoding respectively.

In a possible implementation, the first split data is 360-degree background stream data, and the second split data is foreground stream data within a field of view.

In a possible implementation, the first split data is voice data, and the second split data is video data.

In a possible implementation, the first split data is action data or control information data, and the second split data is picture data, video data, or voice data.

In a possible implementation, the first split data is left-eye video data, and the second split data is right-eye video data.

In a possible implementation, the first split data is rendering metadata, and the second split data is video data.

In a possible implementation, the first QoS configuration information includes latency parameter information and/or packet loss rate parameter information, and the second QoS configuration information includes latency range parameter information and/or packet loss rate range parameter information.

A dynamically changing QoS parameter range may be configured for split data with lower importance, so that the system can flexibly adjust transmission of the split data with lower importance based on a current resource status.

According to a second aspect, an embodiment of this application provides a data transmission method, and the method may include:

A second core network function entity obtains first quality of service QoS configuration information, second QoS configuration information, first split data, and second split data.

The second core network function entity processes the first split data based on the first QoS configuration information, and processes the second split data based on the second QoS configuration information.

The second core network function entity outputs processed first split data and processed second split data.

In a possible implementation, that the second core network function entity processes the first split data based on the first QoS configuration information may specifically include:

The second core network function entity binds a first QoS identifier in the first QoS configuration information to the first split data.

That the second core network function entity processes the second split data based on the second QoS configuration information may specifically include:

The second core network function entity binds a second QoS identifier in the second QoS configuration information to the second split data.

In a possible implementation, the first split data is data within a field of view FOV, and the second split data is data outside the field of view FOV.

In a possible implementation, the first split data is base layer data, and the second split data is enhancement layer data.

In a possible implementation, the first split data is I frame data, I slice data, or I tile data generated during video encoding, and the second split data is P frame data. P slice data, or P tile data generated during corresponding video encoding respectively.

In a possible implementation, the first split data is 360-degree background stream data, and the second split data is foreground stream data within a field of view.

In a possible implementation, the first split data is voice data, and the second split data is video data.

In a possible implementation, the first split data is action data or control information data, and the second split data is picture data, video data, or voice data.

In a possible implementation, the first split data is left-eye video data, and the second split data is right-eye video data.

In a possible implementation, the first split data is rendering metadata, and the second split data is video data.

In a possible implementation, the first QoS configuration information includes latency parameter information and/or packet loss rate parameter information, and the second QoS configuration information includes latency range parameter information and/or packet loss rate range parameter information.

According to a third aspect, an embodiment of this application provides a communication apparatus, and the apparatus may include:

a processing module and a transceiver module.

The transceiver module is configured to receive multi-stream transmission information of a service, where the multi-stream transmission information may indicate that the service is transmitted via first split data and second split data.

The processing module is configured to generate first quality of service QoS configuration information and second QoS configuration information based on the multi-stream transmission information, where the first QoS configuration information corresponds to the first split data, and the second QoS configuration information corresponds to the second split data.

The transceiver module is further configured to output the first QoS configuration information and the second QoS configuration information.

In a possible implementation, the processing module is further configured to:
generate association information, where the association information indicates that the first split data and the second split data are associated with the service.

The transceiver module is further configured to output the association information.

In a possible implementation, the processing module is further configured to:
generate first receiving indication information, where the first receiving indication information may indicate a sequence of receiving the first split data and the second split data.

The transceiver module is further configured to output the first receiving indication information.

In a possible implementation, the processing module is further configured to:
generate second receiving indication information, where the second receiving indication information may indicate to ignore the first split data and/or the second split data.

The transceiver module is further configured to output the second receiving indication information.

In a possible implementation, the first split data is data within a field of view FOV, and the second split data is data outside the field of view FOV.

In a possible implementation, the first split data is base layer data, and the second split data is enhancement layer data.

In a possible implementation, the first split data is I frame data, I slice data, or I tile data generated during video encoding, and the second split data is P frame data, P slice data, or P tile data generated during corresponding video encoding respectively.

In a possible implementation, the first split data is 360-degree background stream data, and the second split data is foreground stream data within a field of view.

In a possible implementation, the first split data is voice data, and the second split data is video data.

In a possible implementation, the first split data is action data or control information data, and the second split data is picture data, video data, or voice data.

In a possible implementation, the first split data is left-eye video data, and the second split data is right-eye video data.

In a possible implementation, the first split data is rendering metadata, and the second split data is video data.

In a possible implementation, the first QoS configuration information includes latency parameter information and/or packet loss rate parameter information, and the second QoS configuration information includes latency range parameter information and/or packet loss rate range parameter information.

According to a fourth aspect, an embodiment of this application provides a communication apparatus, and the apparatus may include:

a processing module and a transceiver module.

The transceiver module is configured to obtain first quality of service QoS configuration information, second QoS configuration information, first split data, and second split data.

The processing module is configured to process the first split data based on the first QoS configuration information, and process the second split data based on the second QoS configuration information.

The transceiver module is further configured to output processed first split data and processed second split data.

Optionally, during downlink transmission in a wireless cellular network, the communication apparatus may be the second core network function entity described in the second aspect of this application. The communication apparatus may obtain the first QoS configuration information and the second QoS configuration information from a first core network function entity, obtain the first split data and the second split data from a server, and then process the split data based on the obtained QoS configuration information. During uplink transmission in the wireless cellular network, the communication apparatus may be a terminal. The communication apparatus may obtain the first QoS configuration information and the second QoS configuration information from the first core network function entity, split data that needs to be sent by the communication apparatus to obtain the first split data and the second split data, and then process the split data based on the obtained QoS configuration information.

Further, during uplink transmission, the terminal may further send different split data in different transmission modes based on QoS configuration information corresponding to different split data.

In a possible implementation, the processing module is specifically configured to:
bind a first QoS identifier in the first QoS configuration information to the first split data, and
bind a second QoS identifier in the second QoS configuration information to the second split data.

In a possible implementation, the first split data is data within a field of view FOV, and the second split data is data outside the field of view FOV.

In a possible implementation, the first split data is base layer data, and the second split data is enhancement layer data.

In a possible implementation, the first split data is I frame data, I slice data, or I tile data generated during video encoding, and the second split data is P frame data, P slice data, or P tile data generated during corresponding video encoding respectively.

In a possible implementation, the first split data is 360-degree background stream data, and the second split data is foreground stream data within a field of view.

In a possible implementation, the first split data is voice data, and the second split data is video data.

In a possible implementation, the first split data is action data or control information data, and the second split data is picture data, video data, or voice data.

In a possible implementation, the first split data is left-eye video data, and the second split data is right-eye video data.

In a possible implementation, the first split data is rendering metadata, and the second split data is video data.

In a possible implementation, the first QoS configuration information includes latency parameter information and/or packet loss rate parameter information, and the second QoS configuration information includes latency range parameter information and/or packet loss rate range parameter information.

According to a fifth aspect, an embodiment of this application provides a communication apparatus, and the apparatus may include:
a processor, where the processor is coupled to a memory, and the memory is configured to store a program or instructions. When the program or the instructions are executed by the processor, the communication apparatus is enabled to perform the method according to any one of the first aspect or the implementations of the first aspect.

According to a sixth aspect, an embodiment of this application provides an apparatus. The apparatus provided in this application has functions of implementing behavior of the communication apparatus in the method in the first aspect, and includes a corresponding means (means) configured to perform the steps or functions described in the method in the first aspect. The steps or functions may be implemented by using software, hardware (for example, a circuit), or a combination of hardware and software.

In a possible design, the apparatus includes one or more processors and a communication unit. The one or more processors are configured to support the apparatus in performing a corresponding function of the communication apparatus in the method in the first aspect. Optionally, the apparatus may further include one or more memories. The memory is coupled to the processor, and stores program instructions and/or data necessary for the apparatus. The one or more memories may be integrated with the processor, or may be separated from the processor. This is not limited in this application.

The apparatus may be a function entity in a core network, for example, a network exposure function entity NEF, a policy and charging function entity PCF, or a session management function entity SMF. The communication unit may be a transceiver or a transceiver circuit. Optionally, the transceiver may alternatively be an input/output circuit or an interface.

The apparatus may alternatively be a communication chip. The communication unit may be an input/output circuit or an interface of the communication chip.

In another possible design, the apparatus includes a transceiver, a processor, and a memory. The processor is configured to control the transceiver or an input/output circuit to receive/send a signal, the memory is configured to store a computer program, and the processor is configured to run the computer program in the memory, so that the apparatus performs the method completed by a remote unit in any one of the first aspect or the possible implementations of the first aspect.

According to a seventh aspect, an embodiment of this application provides an apparatus. The apparatus provided in this application has functions of implementing behavior of the communication apparatus in the method in the second aspect, and includes a corresponding means (means) configured to perform the steps or functions described in the method in the second aspect. The steps or functions may be implemented by using software, hardware (for example, a circuit), or a combination of hardware and software.

In a possible design, the apparatus includes one or more processors and a communication unit. The one or more processors are configured to support the apparatus in performing a corresponding function of the communication apparatus in the method in the second aspect. Optionally, the apparatus may further include one or more memories. The memory is coupled to the processor, and stores program instructions and/or data necessary for the apparatus. The one or more memories may be integrated with the processor, or may be separated from the processor. This is not limited in this application.

The apparatus may be a function entity in a core network, for example, a user plane function entity UPF, and the communication unit may be a transceiver or a transceiver circuit. Optionally, the transceiver may alternatively be an input/output circuit or an interface.

The apparatus may alternatively be a communication chip. The communication unit may be an input/output circuit or an interface of the communication chip.

In another possible design, the apparatus includes a transceiver, a processor, and a memory. The processor is configured to control the transceiver or an input/output circuit to receive/send a signal, the memory is configured to store a computer program, and the processor is configured to run the computer program in the memory, so that the apparatus performs the method completed by a remote unit in any one of the second aspect or the possible implementations of the second aspect.

According to an eighth aspect, a computer-readable storage medium is provided, where the computer-readable storage medium stores a computer program or instructions, and when the computer program or the instructions are executed, a computer is enabled to perform the instructions of the method in any one of the first aspect or the possible implementations of the first aspect.

According to a ninth aspect, a computer-readable storage medium is provided, where the computer-readable storage medium stores a computer program or instructions, and when the computer program or the instructions are executed, a computer is enabled to perform the instructions of the method in any one of the second aspect or the possible implementations of the second aspect.

According to a tenth aspect, a computer program product is provided. The computer program product includes computer program code. When the computer program code is run on a computer, the computer is enabled to perform the method according to any one of the first aspect or the possible implementations of the first aspect.

According to an eleventh aspect, a computer program product is provided. The computer program product includes computer program code. When the computer program code is run on a computer, the computer is enabled to perform the method according to any one of the second aspect or the possible implementations of the second aspect.

According to a twelfth aspect, a system is provided. The system includes the foregoing two communication apparatuses, a server, an access network device, and a terminal.

According to a thirteenth aspect, a data transmission method is provided, including:

A sending device splits service data to obtain first split data and second split data, where the first split data corresponds to first quality of service QoS configuration information, and the second split data corresponds to second QoS configuration information.

The sending device sends the first split data and the second split data to a receiving device.

In a possible implementation, that the sending device splits the service data to obtain the first split data and the second split data includes:

The sending device splits the service data based on a field of view area in which data in a field of view FOV of human eyes is located, to obtain the first split data and the second split data.

Alternatively, the sending device splits the service data based on scalable high efficiency video coding SHVC modes, to obtain the first split data and the second split data.

Alternatively, the sending device splits the service data based on a field of view area in which data in a FOV of human eyes is located and SHVC modes, to obtain the first split data and the second split data.

In a possible implementation, if split data of the service is transmitted in downlink in a wireless cellular network, the sending device is a server of the service, and the receiving device is a first terminal, the method further includes:

The server sends multi-stream transmission information of the service to a first core network function entity.

The multi-stream transmission information of the service includes service identification information of the service, stream identification information of the first split data, stream identification information of the second split data, and QoS requirement information during multi-stream transmission.

That the sending device sends the first split data and the second split data to the receiving device includes:

The server sends the first split data and the second split data to the first terminal via a second core network function entity and an access network device that obtain first QoS configuration information and the second QoS configuration information.

In a possible implementation, if split data of the service is transmitted in uplink in the wireless cellular network, the sending device is the first terminal, and the receiving device is the server of the service, the method further includes:

The first terminal obtains the first QoS configuration information and the second QoS configuration information.

That the sending device sends the first split data and the second split data to the receiving device includes:

Based on the first QoS configuration information and the second QoS configuration information, the first terminal sends the first split data and the second split data to the server via the access network device and the second core network function entity that obtain the first QoS configuration information and the second QoS configuration information.

In a possible implementation, if the sending device has a device-to-device D2D transmission requirement, the sending device is the first terminal, and the receiving device is a second terminal, the method further includes:

The sending device obtains the first QoS configuration information and the second QoS configuration information.

That the sending device sends the first split data and the second split data to the receiving device includes:

The first terminal sends the first split data and the second split data to the second terminal based on the first QoS configuration information and the second QoS configuration information.

In a possible implementation, if the split data of the service is transmitted in a wireless local area network, the sending device is the first terminal, and the receiving device is the second terminal, the method further includes:

The first terminal sends the multi-stream transmission information of the service to an access point in the wireless local area network.

The multi-stream transmission information of the service includes service identification information of the service, stream identification information of the first split data, stream identification information of the second split data, and QoS requirement information during multi-stream transmission.

The first terminal obtains the first QoS configuration information and the second QoS configuration information, where the first QoS configuration information and the second QoS configuration information are configured by the access point of the wireless local area network.

That the sending device sends the first split data and the second split data to the receiving device includes;

The first terminal sends, based on the first QoS configuration information and the second QoS configuration information, the first split data and the second split data to the second terminal via the access point of the wireless local area network.

In a possible implementation, if the split data of the service is transmitted in the wireless local area network, the sending device is the server of the service, and the receiving devices are the first terminal and the second terminal, the method further includes:

The server sends the multi-stream transmission information of the service to a carrier network function entity or the access point of the wireless local area network.

The multi-stream transmission information of the service includes service identification information of the service, stream identification information of the first split data, stream identification information of the second split data, and QoS requirement information during multi-stream transmission.

That the sending device sends the first split data and the second split data to the receiving device includes:

The server sends the first split data and the second split data to the first terminal and the second terminal via the carrier network function entity that obtains the first QoS configuration information and the second QoS configuration information and the access point of the wireless local area network.

In a possible implementation, if the sending device has a relay transmission requirement, the sending device sends the first split data and the second split data to the receiving device via a relay device.

According to a fourteenth aspect, a data transmission system is provided, and the system may include:

a sending device, configured to split service data, to obtain first split data and second split data;

a first core network function entity, configured to: receive multi-stream transmission information of the service, where the multi-stream transmission information indicates that the service is transmitted via the first split data and the second split data; generate first quality of service QoS configuration information and second QoS configuration information based on the multi-stream transmission information, where the first QoS configuration information corresponds to the first split data, and the second QoS configuration information corresponds to the second split data; and send the first QoS configuration information and the second QoS configuration information to a second core network function entity, an access network device, and a receiving device;

a second core network function entity, configured to: obtain the first QoS configuration information, the second QoS configuration information, the first split data, and the second split data perform binding processing on the first split data based on the first QoS configuration information, perform binding processing on the second split data based on the second QoS configuration information; and output processed first split data and processed second split data;

an access network device, configured to: receive the processed first split data and the processed second split data that are output by the second core network function entity, and determine a first transmission mode of the first split data and a second transmission mode of the second split data based on the first QoS configuration information and the second QoS configuration information; and send the first split data to the receiving device based on the first transmission mode, and send the second split data to the receiving device based on the second transmission mode; and a receiving device, configured to: receive the first QoS configuration information and the second QoS configuration information, receive the first split data sent in the first transmission mode and the second split data sent in the second transmission mode by the access network device, and demodulate and decode the received data.

According to a fifteenth aspect, a data transmission system is provided, including:

a sending device, configured to split service data, to obtain first split data and second split data;

a first core network function entity, configured to: receive multi-stream transmission information of a service, where the multi-stream transmission information indicates that the service is transmitted via the first split data and the second split data; generate first quality of service QoS configuration information and second QoS configuration information based on the multi-stream transmission information, where the first QoS configuration information corresponds to the first split data, and the second QoS configuration information corresponds to the second split data; and send the first QoS configuration information and the second QoS configuration information to a second core network function entity, an access network device, and a sending device, where the sending device is further configured to: obtain the first QoS configuration information and the second QoS configuration information, bind the first split data based on the first QoS configuration information, and bind the second split data based on the second QoS configuration information; determine a first transmission mode of the first split data and a second transmission mode of the second split data based on the first QoS configuration information and the second QoS configuration information; and send the first split data to the access network device in the first transmission mode, and send the second split data to the access network device in the second transmission mode;

the access network device, configured to: receive the first QoS configuration information and the second QoS configuration information; and receive the first split data sent in the first transmission mode and the second split data sent in the second transmission mode by the sending device, and send the first split data and the second split data to the second core network function entity;

the second core network function entity, configured to receive processed first split data and processed second split data that are sent by the access network device, and send the processed first split data and the processed second split data to a receiving device; and the receiving device, configured to: receive the first split data and the second split data that are sent by the second core network function entity, and separately decode the received split data.

BRIEF DESCRIPTION OF DRAWINGS

To describe technical solutions in embodiments of this application more clearly, the following describes the accompanying drawings used in embodiments of this application.

DESCRIPTION OF EMBODIMENTS

The following describes embodiments of this application with reference to the accompanying drawings in embodiments of this application.

The terms "including", "comprising", or any other variant thereof mentioned in the specification, claims, and the accompanying drawings of this application, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The method provided in embodiments of this application may be applied to a communication system. The communication system may be but is not limited to a long term evolution (long term evolution, LTE for short) communication system, a new radio access technology (new radio access technology, NR for short) communication system, a 4th generation (4th generation, 4G for short) communication system, a 4.5G communication system, a 5G communication system, a 5.5G communication system, a 6G communication system, a system integrating a plurality of communication systems, or a future evolved communication system. The communication systems include, for example, a long term evolution (long term evolution, LTE for short) system, a new radio (new radio, NR for short) system, a wireless-fidelity (wireless-fidelity, Wi-Fi for short) system, a communication system related to the 3rd generation partnership project (3rd generation partnership project, 3GPP for short), and another communication system of this type.

Figure 1:
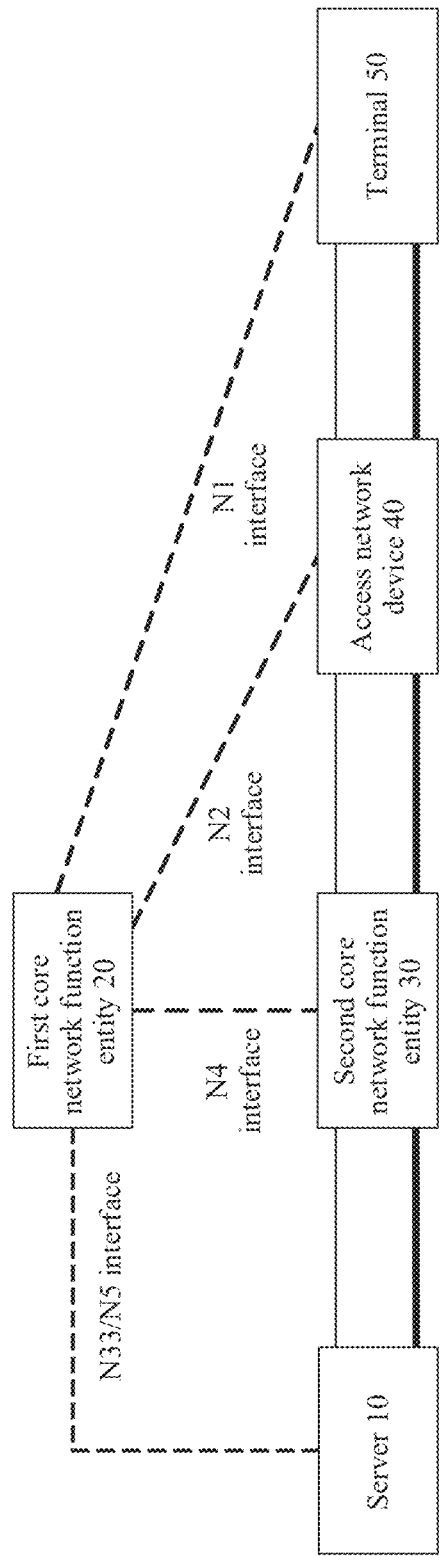
FIG. 1 is a schematic diagram of an architecture of a communication system according to an embodiment of this application.

FIG. 1 is a schematic diagram of an architecture of a communication system according to an embodiment of this application.

As shown in FIG. 1, the architecture may include the following devices.

A server 10 may be configured to provide a computing or application service for a terminal 50. The server 10 may be deployed in cloud or locally, and may be wired or wirelessly connected to a core network. The server 10 may send multi-stream transmission information to a first core network function entity 20, to notify the core network that there is a requirement for performing multi-stream transmission on service data currently. Data is split during downlink transmission, and split data is received and decoded during uplink transmission.

The first core network function entity 20 may be configured to complete three functions: registration, connection, and session management for the terminal 50. Quality of service (quality of service, QoS for short) configuration information whose quantity is the same as that corresponding to multi-stream transmission may be generated based on the multi-stream transmission requirement of the server 10 or the terminal 50, to provide QoS guarantee for multi-stream transmission of the service. Depending on different communication technology versions and network architectures, specific network elements included in the first core network function entity 20 may be different accordingly. For example, in an NR network, the first core network function entity 20 may include a network exposure function module (network exposure function. NEF for short), which may exhibit a multi-stream QoS network interface such as an N33 interface for access by the server 10, to facilitate the server 10 for sending the multi-stream transmission information. The first core network function entity 20 may further include a session management function module (session management function, SMF for short), which may deliver a plurality of pieces of QoS configuration information transmitted in multi-stream to a second core network function entity 30, an access network device 40, and the terminal 50. In addition, the SMF may further deliver association information between multi-stream and reception indication information for receiving the multi-stream. For another example, in an LTE network, the first core network function entity 20 may include a charging policy management function module (policy control function, PCF for short) and an SMF. The PCF may exhibit a multi-stream QoS network interface such as an N5 interface for access by the server 10, to facilitate the server 10 for sending the multi-stream transmission information. A function thereof is similar to the function of the NEF in the NR network, and details are not described herein again. However, in a subsequent later version of communication technology and network architecture, the first core network function entity 20 may alternatively be another network element or module for implementing the foregoing functions. This is not limited in embodiments of this application.

The second core network function entity 30 may perform specific user plane data forwarding, and generate a call detail record depending on traffic. It also functions as a data plane anchor. During multi-stream transmission, the QoS configuration information generated by the first core network function entity may be bound to corresponding split data. In the LTE network or the NR network, the second core network function entity 30 may be a user plane function module (user plane function, UPF for short). However, in a subsequent later version of communication technology and network architecture, the second core network function entity 30 may alternatively be another network element or module for implementing the foregoing functions. This is not limited in embodiments of this application.

The access network device 40 may be connected to the terminal 50, for exchanging data with the terminal 50. During multi-stream transmission, the access network device 40 may be configured to perform corresponding modulation and coding processing on split data based on QoS configuration information corresponding to the split data, allocate a time-frequency resource, configure a quantity of retransmissions, and the like. In a downlink direction, multi-stream data sent by the server 10 is transmitted to the terminal 50. In an uplink direction, multi-stream data sent by the terminal 50 is transmitted to the server 10. The access network device 40 may be an evolved NodeB (such as a NodeB, an eNB, or an e-NodeB) in LTE, or may be a base station (such as a gNodeB or a gNB) in NR, a transmission reception point (transmission receiving point/transmission reception point, TRP for short), or the like. A specific form of the access network device 40 may be a macro base station, a micro base station, a pico base station, a small cell, a relay station, a balloon station, or the like. A plurality of access network devices 40 may support a network using a same technology above, or may support networks using different technologies above. The access network device 40 may include one or more co-site or non-co-site TRPs. The access network device 40 may communicate with the terminal 50 directly, or may communicate with the terminal via a relay device.

The terminal 50 is a device that has a wireless transceiver function. During multi-stream transmission, the terminal 50 may receive, in a downlink direction, multi-stream data sent by the access network device, and separately demodulate and decode the multi-stream data, and may split data and send the data to the access network device in an uplink direction. The terminal device may be deployed on land, including an indoor, outdoor, handheld, wearable, or vehicle-mounted device; or may be deployed on a water surface (for example, on a ship); or may be deployed in the air (for example, on a plane, a balloon, or a satellite). The terminal 50 may also be referred to as user equipment (user equipment, UE for short), a user terminal, a terminal device, an access terminal device, an in-vehicle terminal, an industrial control terminal, a UE unit, a UE station, a mobile station, a remote station, a remote terminal device, a mobile device, a UE terminal device, a mobile terminal, a wireless communication device, a UE agent, a UE apparatus, or the like. The terminal may be fixed, movable, or the like. A specific form of the terminal may be a mobile phone (mobile phone), a tablet computer (Pad), a computer with a wireless transceiver function, a wireless terminal in industrial control (industrial control), an in-vehicle terminal device, a wireless terminal in unmanned driving (self driving), a wireless terminal in telemedicine (telemedicine), a wireless terminal in a smart grid (smart grid), a wireless terminal in transportation security (transportation safety), a wireless terminal in a smart city (smart city), a wireless terminal in a smart home (smart home), or a wearable terminal device, and the like.

Alternatively, the terminal in this application may be a VR terminal, an AR terminal, or an MR terminal. The VR terminal, the AR terminal, and the MR terminal may all be referred to as XR terminals. The XR terminal may be, for example, a head mounted device (for example, a helmet or glasses), or may be an all-in-one machine, or may be a television, a display, a car, an in-vehicle device, a tablet, or a smart screen. The XR terminal can present XR data to a user, and the user can experience diversified XR services by wearing or using the XR terminal. The XR terminal may access a network in a wireless or wired manner, for example, via a Wi-Fi or 5G system.

XR technologies have advantages such as multi-view and strong interaction, can provide brand-new visual experience for users, and has great application value and business potential. XR includes technologies such as VR, AR, and MR, and can be widely used in many fields such as entertainment, gaming, healthcare, advertising, industry, online education, and engineering. The VR technology is mainly to render visual and audio scenarios to simulate sensory stimulation of vision and audio in the real world to users as much as possible. The VR technology usually requires users to wear XR terminals (for example, head mounted devices) to simulate vision and/or hearing of the users. The VR technology may further perform action tracking on the users, to update simulated visual and/or auditory content in a timely manner. The AR technology is mainly to provide additional visual and/or auditory information or manually generated content in a real environment perceived by users. The users may directly (where for example, sensing, processing, and rendering is not performed) or indirectly (where for example, transfer is performed by using a sensor or the like) perceive the real environment, and further enhancement processing is performed. The MR technology is to insert some virtual elements into physical scenarios, to provide users with immersive experience by adding these elements as a part of a real scenario. A network device may process and transmit data (which may be referred to as XR data) generated by the XR service. For example, a network device in cloud may render and encode (for example, source encode) XR source data, and transmit XR data to an XR terminal via a network device in a core network and/or an access network. The XR terminal provides diversified XR experience (for example, immersive experience, visual experience, interaction experience, or device experience) for users by processing the XR data. The XR experience may be evaluated from a plurality of different dimensions, for example, including one or more of the following dimensions: image definition, image smoothness, image distortion, image stereoscopy, image black borders, image smearing, sound quality, sound effect, field of view, freezing, artifacts, dizziness, audio and video synchronization, interaction freedom, interaction operation response speed, interaction operation precision, interaction content loading speed, terminal wearing comfort, terminal wearing fatigue, terminal battery life, terminal portability, terminal visual impairment friendliness, or the like.

The server 10 may be connected to the first core network function entity 20 through an N33 interface or an N5 interface, the first core network function entity may be connected to the second core network function entity through an N4 interface, the first core network function entity 20 may be further connected to the access network device 40 through an N2 interface, and the first core network function entity 20 may be further connected to the terminal 50 through an N1 interface. Double straight lines connecting the server 10, the second core network function entity 30, the access network device 40, and the terminal 50 represent multi-stream transmission obtained through data splitting is performed on the service data, and transmission of different split data is distinguished by thin solid lines and thick solid lines. In descriptions of accompanying drawings in subsequent embodiments, double straight lines connected between different devices all indicate that multi-stream transmission is performed on service data.

For current and future services having high rate and low latency transmission requirements, a method for splitting data and configuring corresponding QoS configuration information for different split data in this application may be used for transmission. A quantity of pieces of split data may be flexibly changed depending on actual application requirements. For simpler and clearer description, a manner of splitting two pieces of split data is mainly used for description in this application. In the case of splitting service data into three or more pieces of split data, processing manners are basically the same. The following describes in detail, with reference to FIG. 2 to FIG. 9, the data transmission method in this application and different applicable scenarios.

Figure 2:
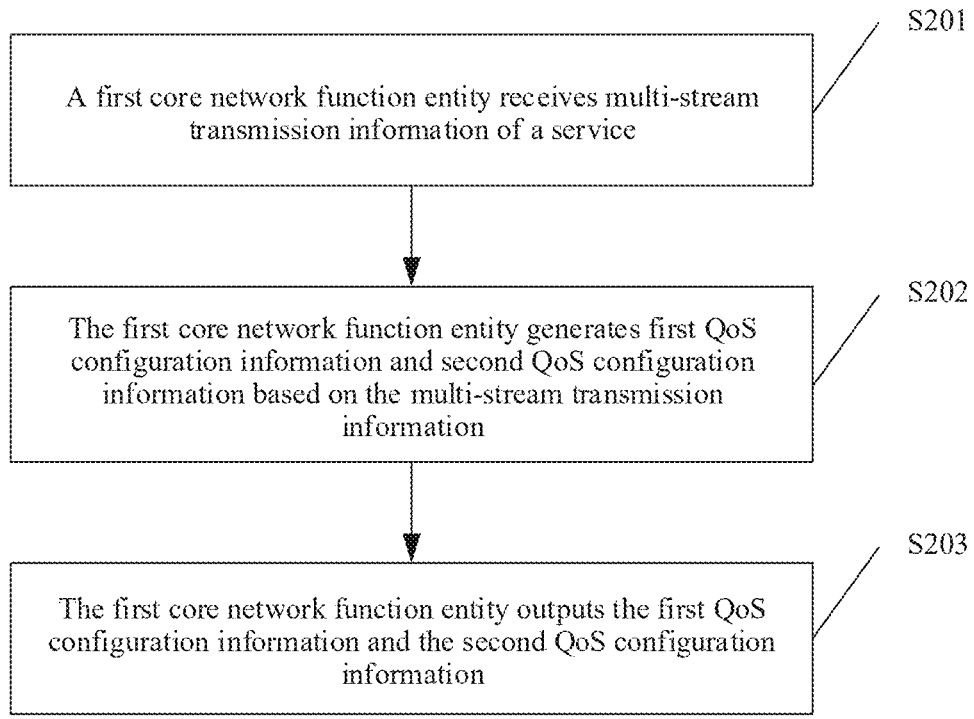
FIG. 2 is a schematic flowchart of a data transmission method according to an embodiment of this application.

FIG. 2 is a schematic flowchart of a data transmission method according to an embodiment of this application. The method may include the following steps.

S201: A first core network function entity receives multi-stream transmission information of a service, where the multi-stream transmission information indicates that the service is transmitted via first split data and second split data.

Optionally, the multi-stream transmission information may include:

service identification information for identifying the service;

splitting identification information for identifying split data, where for example, the splitting identification information includes first splitting identification information and second splitting identification information in the case of splitting the service data into the first split data and the second split data; and QoS requirement information of multi-stream transmission, for representing a QoS requirement such as a latency requirement or a packet loss rate requirement during the multi-stream transmission, where a quantity of pieces of the QoS requirement information is corresponding to a quantity of pieces of the splitting identification information. For example, the first splitting identification information corresponds to first QoS requirement information, and the second splitting identification information corresponds to second QoS requirement information. The first QoS requirement information and the second QoS requirement information may be the same, or may be different. This is not limited in this embodiment of this application.

Optionally, the multi-stream transmission information may further include splitting quantity information, or splitting quantity information may also be implicitly indicated via the splitting identification information.

S202: The first core network function entity generates first quality of service QoS configuration information and second QoS configuration information based on the multi-stream transmission information, where the first QoS configuration information corresponds to the first split data, and the second QoS configuration information corresponds to the second split data.

Optionally, one piece of QoS configuration information may include a QoS parameter type that needs to be configured, for example, a latency and a packet loss rate, or may further include a parameter type such as a throughput. In addition, the QoS configuration information further includes a parameter value corresponding to the parameter type. For example, the packet loss rate is 20%. When the packet loss rate of data transmission is less than or equal to 20%, normal transmission may be performed. When the packet loss rate is greater than 20%, retransmission needs to be performed based on a specified quantity of retransmissions.

In an optional splitting manner, the first split data and the second split data may be obtained by splitting the service data based on a field of view area in which data in a field of view (field of view, FOV for short) of human eyes is located, where the first split data is data within the field of view FOV, and the second split data is data outside the field of view FOV. The data within the FOV is more important than the data outside the FOV. The data within the FOV can provide basic service experience for users, and the data outside the FOV can provide further service experience for the user based on the data within the FOV. Therefore, the first split data is data that requires successful transmission as much as possible, and higher-level QoS configuration information may be configured for the first split data. For example, QoS configurations such as a lower latency, a lower packet loss rate, and a higher throughput may be provided for the first split data. A transmission requirement of the second split data is properly reduced. For example, QoS configurations such as a higher latency, a higher packet loss rate, and a lower throughput are provided for the second split data.

In another optional splitting manner, the first split data and the second split data are obtained by splitting the service data based on scalable high efficiency video coding (scalable high efficiency video coding, SHVC for short) modes, where the first split data is base layer (base layer, BL for short) data, and the second split data is enhancement layer (enhancement layer, EL for short) data. The base layer data is more important than the enhancement layer data. The base layer data can provide basic service experience for users, and the enhancement layer data can provide further service experience for the users based on the base layer data. Therefore, QoS configuration may also be performed for different split data in a manner similar to the foregoing QoS configuration manner, and details are not described herein again.

In an optional splitting manner, the first split data is I frame data, I slice data, or I tile data generated during video encoding, and the second split data is P frame data. P slice data, or P tile data generated during corresponding video encoding respectively.

The I-frame is an intra coded frame, also referred to as a key frame, is an independent frame that carries all information. The I-frame is decoded independently without referring to other images. The first frame in a frame sequence is usually an I-frame.

The P-frame is an inter-prediction coded frame. Generally, decoding can be performed only by referring to a previous I-frame, indicating the difference between a current frame and a previous frame (where the previous frame may be an I-frame or a P-frame). When decoding, the previously cached picture needs to be used to overlay change defined in this frame to generate a final picture. Compared with the I-frame, the P-frame usually occupies fewer data bits. The P-frame is sensitive to transmission errors because it has complex dependency on a previous P-reference frame and I-reference frame.

Similar to a relationship between the I-frame and the P-frame, for an I slice/I tile and a P slice/P tile, a plurality of slices (slices) or tiles (tiles) may be generated in a video frame encoding process, and slices or tiles of a same frame are independently encoded and decoded. As described above, the I tile or the I slice also has all information in the tile or the slice, and can be decoded independently without referring to a tile or a slice of another image. The P tile or the P slice can be decoded only by referring to a slice or a tile of the corresponding position. In this case, the QoS configuration may also be performed for different split data in a manner similar to the foregoing QoS configuration manner.

In an optional splitting manner, the first split data is 360-degree background stream data, and the second split data is foreground stream data within the field of view.

The 360-degree background stream data is low-resolution and low-definition video data (with a relatively small data amount) sent from all angles (360 degrees) to ensure that users can conveniently see a picture in a timely manner during XR experience. The foreground stream data within the field of view is high-resolution and high-definition video data in the field of view observed by the users, which comparatively can improve visual experience for the users.

In an optional splitting manner, the first split data is voice data, and the second split data is video data.

In an optional splitting manner, the first split data is action data or control information data, and the second split data is picture data, video data, or voice data.

Different types of the first split data and different types of the second split data herein may be randomly combined depending on actual use scenarios. This is not limited herein.

In an optional splitting manner, the first split data is left-eye video data, and the second split data is right-eye video data.

In an optional splitting manner, the first split data is rendering metadata, and the second split data is video data.

The rendering metadata(metadata) is data (with a relatively small data amount) that is sent by a server to a terminal side or sent by a terminal side to a server and that is used in a distributed rendering scenario, and rendered data (with a relatively large data amount) is generated by the terminal side/server based on the rendering metadata.

It should be noted that, in addition to basic determining of importance of the base layer data and the enhancement layer data, importance of the foregoing different split data may be different in different scenarios. Therefore, different levels of QoS configuration information may be configured for different data streams based on importance of data transmission in a current scenario. This is not limited herein.

For example, to ensure that the foreground stream data within the field of view of the users is transmitted with higher quality, higher-level QoS configuration information may be configured for the foreground stream data. To reduce dizziness caused when the users turn head during using the VR, higher-level QoS configuration information may also be configured for the 360-degree background stream data. This is not limited herein.

In another optional splitting manner, the service data may be divided into three pieces of split data: first split data, second split data, and third split data. For example, the three pieces of split data may be obtained by splitting the service data based on a field of view area in which data in a human eye FOV is located and SHVC modes, where the first split data is base layer data within the field of view, the second split data is enhancement layer data within the field of view, and the third split data is base layer data outside the field of view. Importance of the base layer data within the field of view is higher than that of the enhancement layer data within the field of view, importance of the enhancement layer data within the field of view is higher than that of the base layer data outside the field of view, and importance of the base layer data outside the field of view is higher than that of the enhancement layer data outside the field of view. Therefore, transmission assurance priorities may also be determined based on the importance of the data, and corresponding QoS configuration information is configured for the different split data. For example, first QoS configuration information is configured for the first split data, second QoS configuration information is configured for the second split data, and third QoS configuration information is configured for the third split data. The split data is then transmitted based on the data transmission path shown in FIG. 1. In this way, higher-importance data can be transmitted normally, and lower-importance data can be transmitted as much as possible within a system capacity.

In another possible implementation, the first split data may be data such as action data/control information, the second split data may be voice data, and the third split data may be picture/video data, or the like.

The video data may be further divided into multi-stream formed by a base layer data and an enhancement layer data, or further divided into multi-stream formed by I-frame/I-slice/I-tile data and corresponding P-frame/P-slice/P-tile data, or further divided into multi-stream formed by 360-degree background stream data and foreground stream data within the field of view, to implement transmission of three or more streams. Accordingly, QoS needs to be configured for each part of split data.

In addition to the foregoing several optional data splitting manners, any other encoding manner or data splitting manner in which splitting processing can be performed on data is applicable to the data transmission method in this application. This is not limited in this application.

In this splitting transmission mode, storage pressure of a data source end, that is, a sending device, can be significantly reduced. For example, for an XR service, a server previously needs to store video data in a plurality of resolution formats such as 1080P, 2K, and 4K, and then transmits video data of different resolutions based on resolutions selected by users on a receiving device, that is, a terminal side. However, in the splitting transmission mode in this embodiment of this application, the sending device may store only video data of a higher resolution, split the video data of the higher resolution to obtain a plurality of streams of split data, transmit different split data in a differentiated manner, and receive all or some of the different split data on the receiving device side, to obtain an experience effect similar to that of a plurality of resolutions.

Optionally, an example in which there are two streams of split data and importance of the first split data is higher than that of the second split data is used. The first QoS configuration information may include latency parameter information and/or packet loss rate parameter information, and the second QoS configuration information may include latency range parameter information and/or packet loss rate range parameter information.

For example, the packet loss rate parameter set in the first QoS configuration information is 10%, and the parameter information of the packet loss rate range set in the second QoS configuration information is 20% to 50%. During data transmission, if the packet loss rate of the first split data is less than or equal to 10%, the first split data can be normally transmitted; if the packet loss rate of the first split data is greater than 10%, the first split data is retransmitted; and if the packet loss rate of the second split data is less than or equal to 20%, the second split data can be normally transmitted; if the packet loss rate of the second split data is greater than 20% and less than or equal to 50%, the second split data can continue to be transmitted. In a transmission process, resources are dynamically adjusted based on a system capacity range. If the resources are robust, more resources are allocated to the system to reduce the packet loss rate. If the resources are insufficient, transmission is performed in a current state. When the packet loss rate is higher than 50%, retransmission is performed or even transmission is abandoned.

S203: The first core network function entity outputs the first QoS configuration information and the second QoS configuration information.

In this embodiment of this application, that multi-stream transmission needs to be performed on the service through data splitting may be determined based on receiving the multi-stream transmission information of the service. Therefore, the QoS configuration information corresponding to a quantity of pieces of split data may be configured and output, so that different split data corresponds to one QoS configuration, and finally, service data splitting and QoS-based transmission are implemented. When the method is applied to a service requiring a high rate and a low latency, it can be ensured that an important part of service data is preferentially ensured, so that a user capacity of the system is improved, and good user experience is ensured.

Figure 3:
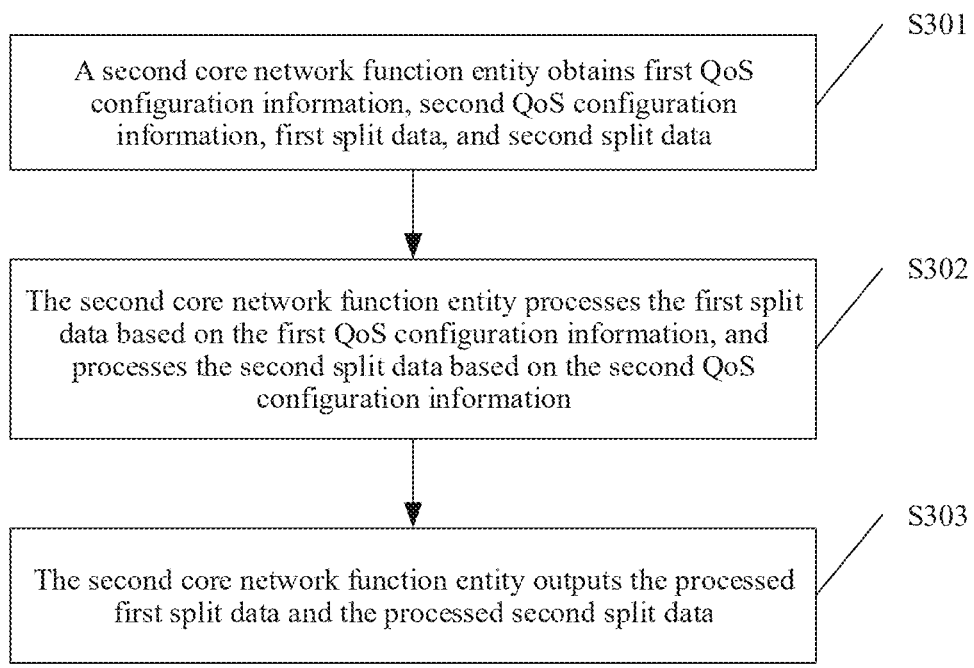
FIG. 3 is a schematic flowchart of another data transmission method according to an embodiment of this application.
Figure 4:
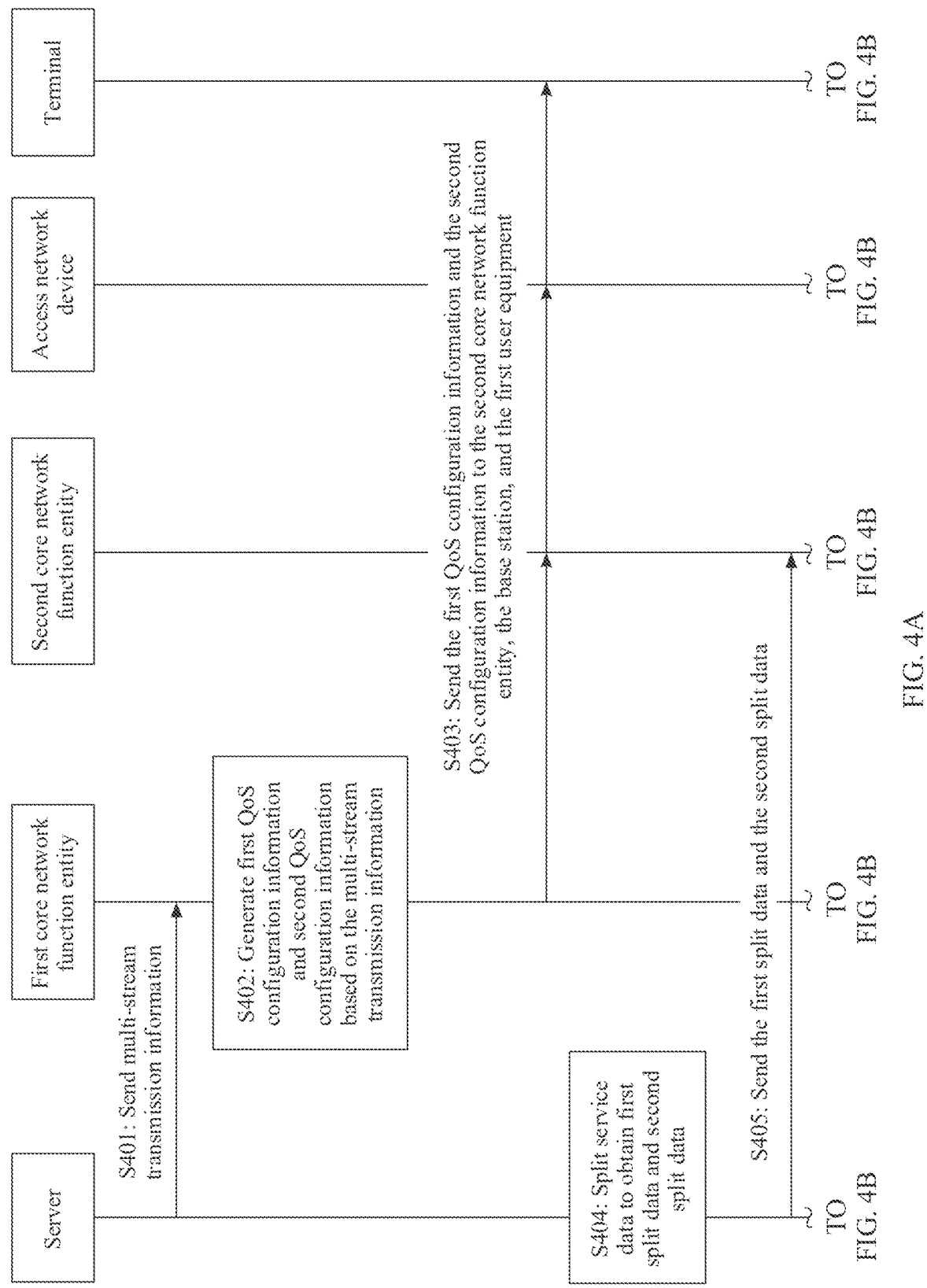
FIG. 4A and FIG. 4B are a schematic flowchart of a data transmission method during downlink transmission according to an embodiment of this application.

After step S203, a second core network function entity receives the first QoS configuration information and the second QoS configuration information that are output by the first core network function entity, and completes data transmission. For a specific procedure, refer to FIG. 3. FIG. 3 is a schematic flowchart of another data transmission method according to an embodiment of this application. Specifically, the following steps may be included:

S301: A second core network function entity obtains first QoS configuration information, second QoS configuration information, first split data, and second split data.

S302: The second core network function entity processes the first split data based on the first QoS configuration information, and processes the second split data based on the second QoS configuration information.

Optionally, the second core network function entity may obtain the splitting identification information described above from the first core network entity, to identify the received split data, identify the received QoS configuration information via QoS identification information such as a QoS identifier in an NR system (5G QoS identifier, 5QI for short), and bind a first QoS identifier in the first QoS configuration information to the first split data, and bind a second QoS identifier in the second QoS configuration information to the second split data.

S303: The second core network function entity outputs processed first split data and processed second split data.

In this embodiment of this application, the second core network function entity receives the split data and the QoS configuration information, and completes binding between the split data and the corresponding QoS configuration information, so that an identification basis for processing different split data can be provided for a subsequent device, to implement differentiated transmission of different split data. This improves a system capacity and user experience.

With reference to the communication architecture in FIG. 1, for an overall procedure of downlink data transmission, refer to FIG. 4A and FIG. 4B. FIG. 4A and FIG. 4B are a schematic flowchart of data transmission during downlink transmission according to an embodiment of this application. The following steps may be specifically included.

S401: A server sends multi-stream transmission information to a first core network function entity.

S402: The first core network function entity generates first QoS configuration information and second QoS configuration information based on the multi-stream transmission information.

Optionally, a terminal may notify, by exchanging information with an application layer of the server, the server that the terminal has a multi-stream transmission requirement, and then the server sends the multi-stream transmission information to the first core network function entity, to trigger the first core network function entity to generate the first QoS configuration information and the second QoS configuration information. Alternatively, the terminal may notify the first core network function entity that the terminal has a multi-stream transmission requirement, to trigger generation and delivery of QoS configuration information. This is not limited in this embodiment of this application.

S403: The first core network function entity sends the first QoS configuration information and the second QoS configuration information to a second core network function entity, an access network device, and the terminal.

Optionally, the first core network function entity may further generate association information, where the association information may indicate that first split data and second split data are associated with the service. The first core network function entity may output the association information to the second core network function entity, the access network device, and the terminal. In this way, these devices know which split data belongs to a same service. For example, there are two servers currently. One server is a service for an XR service and needs to transmit two streams of split data a and b of the XR service, and the other server is a server for an audio service and needs to transmit two streams of split data c and d of the audio service. In this case, the split data a and b may be associated based on association information X, and the split data c and d may be associated based on association information Y.

Optionally, the association information may be service identification information, or may be newly generated identification information. This is not limited in this application.

Optionally, the first core network function entity may further generate first receiving indication information, where the first receiving indication information indicates a sequence in which the second core network function entity, the access network device, or the terminal receives the first split data and the second split data. The first core network function entity outputs the first receiving indication information. For example, these devices may be indicated to simultaneously receive the first split data and the second split data, or may be indicated to receive the first split data before receiving the second split data, or may receive the second split data before receiving the first split data.

Alternatively, the first core network function entity may generate second receiving indication information, where the second receiving indication information indicates the second core network function entity, the access network device, or the terminal to ignore the first split data and/or the second split data. The first core network function entity outputs the second receiving indication information.

It may be understood that the operation of ignoring a stream of split data herein may be first receiving the split data and then discarding the split data, or may be refusing to receive the split data.

S404: The server splits service data to obtain the first split data and the second split data.

For a specific data splitting manner, refer to the descriptions in the embodiment shown in FIG. 2. Details are not described herein again.

S405: The server sends the first split data and the second split data to the second core network function entity.

S406: The second core network function entity binds a first QoS identifier in the first QoS configuration information to the first split data, and binds a second QoS identifier in the second QoS configuration information to the second split data.

S407: The second core network function entity sends processed first split data and processed second split data to the access network device.

S408: The access network device determines, based on the first QoS configuration information and the second QoS configuration information, a first transmission mode of the processed first split data and a second transmission mode of the processed second split data.

Optionally, because different split data separately corresponds to one QoS configuration, the access network device may transmit different split data in different transmission modes. The access network device may determine a transmission mode based on a channel status and different QoS configuration information.

In different transmission modes, modulation and coding schemes (modulation and coding scheme, MCS for short) used during data transmission, allocated time-frequency resources, and configured quantities of retransmissions may be different.

For example, if the first split data is BL data, and the second split data is EL data, different transmission protection policies may be performed based on different QoS configuration information of the BL data and the EL data. In other words, the BL data is transmitted in a first transmission mode with lower bit error rate and lower latency requirements, to ensure successful transmission of the BL data, and the bit error rate and latency requirements of the EL data are properly relaxed, to transmit the EL data as much as possible. In this way, unequal protection-based transmission of the BL data and the EL data is implemented. In addition, transmission may be performed based on different QoS configuration information of the split data using an air interface enhancement technology, for example, network coding, superposition coding, and a multi-stream joint multi-connection technology, to implement air interface enhancement transmission.

S409: The access network device sends the processed first split data to the terminal in the first transmission mode, and sends the processed second split data to the terminal in the second transmission mode.

S410: The terminal separately demodulates and decodes the received two streams of split data.

The terminal separately demodulates and decodes corresponding split data based on the QoS configuration information, which may specifically include demodulation and decoding processing performed on modulation and coding processing on the access network device side, and decoding processing performed on source data encoding on the server side, for example, SHVC decoding processing performed on a plurality of pieces of split data output through SHVC encoding.

A typical XR service is used as an example. For an architecture of a communication system used in this embodiment, refer to the architecture of the communication system shown in FIG. 1. The architecture may be compatible with an existing 5G network architecture. The first core network entity corresponds to the NEF/PCF and the SMF, and the second core network function entity corresponds to the UPF. The server may notify the NEF/PCF that multi-stream transmission needs to be performed, notify the NEF/PCF that the XR service is split into two streams of split data: a BL stream and an EL stream for transmission, and notify the NEF/PCF of a QoS requirement for transmitting the BL data and a QoS requirement for transmitting the EL data. The NEF/PCF generates first QoS configuration information corresponding to the BL data and second QoS configuration information corresponding to the EL data, and sends the first QoS configuration information and the second QoS configuration information to the UPF, the access network device, and the terminal via the SMF. The server splits video data that needs to be transmitted for the XR service to obtain the BL data and the EL data, and then sends the BL data and the EL data to the UPF. The UPF binds the BL data to the first QoS configuration information, and binds the EL data to the second QoS configuration information, and then send the information to the access network device. The access network device performs modulation and coding based on QoS configuration information of different split data in different transmission modes, and sends the different split data to the terminal. The terminal separately demodulates and decodes the different split data to obtain a video frame, and outputs the video frame to a display screen for display. In this way, multi-stream and multi-QoS transmission of the XR service is completed. The BL data may be transmitted using a QoS configuration with a lower latency and a lower packet loss rate, and the EL data may be transmitted using a QoS configuration with a higher latency and a higher packet loss rate, to ensure normal transmission of the BL data, and transmit the EL data as much as possible, so that users can obtain most basic XR service experience, and a series of problems can be avoided such as frame freezing, artifacts, and black borders caused by a channel fluctuation or a small system capacity.

Figure 5:
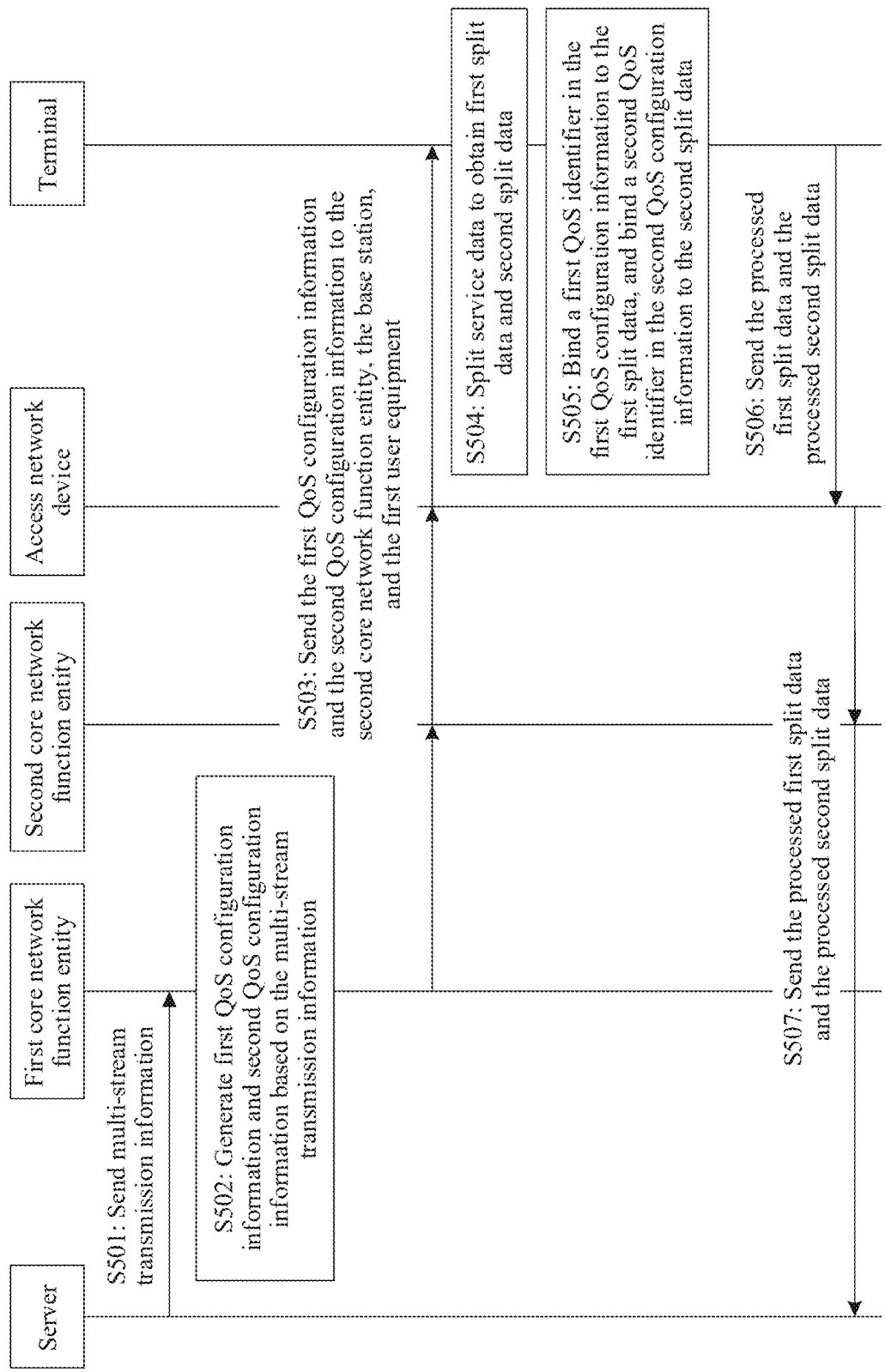
FIG. 5 is a schematic flowchart of a data transmission method during uplink transmission according to an embodiment of this application.

In addition to downlink transmission, uplink transmission may also be performed in the foregoing multi-stream transmission mode. For example, in an uplink video collection and backhaul scenario, based on network performance requirements of typical services in this scenario, the uplink video collection and backhaul scenario also features a high rate and a low latency. In the case of radio channel fluctuation, user experience for videos in the uplink video collection and backhaul scenario also deteriorates significantly. Therefore, a multi-stream transmission mode may also be used to improve transmission effects and user experience. For a specific architecture, refer to the architecture shown in FIG. 1. Because uplink transmission is performed, a data transmission direction is as follows: the terminal-the access network device-the second core network function entity-the server. For a specific procedure, refer to FIG. 5. FIG. 5 is a schematic flowchart of a data transmission method during uplink transmission according to an embodiment of this application. Steps S501 to S503 are similar to steps S401 to S403, and details are not described herein again. After step S503, the method further includes the following steps:

S504: A terminal splits service data to obtain first split data and second split data.

S505: The terminal binds a first QoS identifier in the first QoS configuration information to the first split data, and binds a second QoS identifier in the second QoS configuration information to the second split data.

S506: The terminal sends processed first split data and processed second split data to an access network device. Optionally, the terminal may send the processed first split data and the processed second split data to the access network device using a sending method similar to that of the access network device (transmitting different split data in different transmission modes) in S408.

S507: The access network device sends processed first split data and processed second split data to the server via a second core network function entity.

It may be understood that during uplink transmission, the terminal may notify, by exchanging application layer information, the server that the terminal has a multi-stream transmission requirement, and then trigger generation and delivery of the QoS configuration information in a manner shown in FIG. 4A and FIG. 4B in which the server sends multi-stream transmission information to a first core network function entity. In addition, the terminal may alternatively notify the first core network function entity that the terminal has a multi-stream transmission requirement, to trigger generation and delivery of the QoS configuration information. This is not limited in this embodiment of this application.

In addition, in embodiments of this application, the first core network function entity and the second core network function entity are split based on different functions. In an actual scenario or a future network architecture, the first core network function entity and the second core network function entity may be separately disposed, or may be combined together. This is not limited in embodiments of this application.

Figure 6:
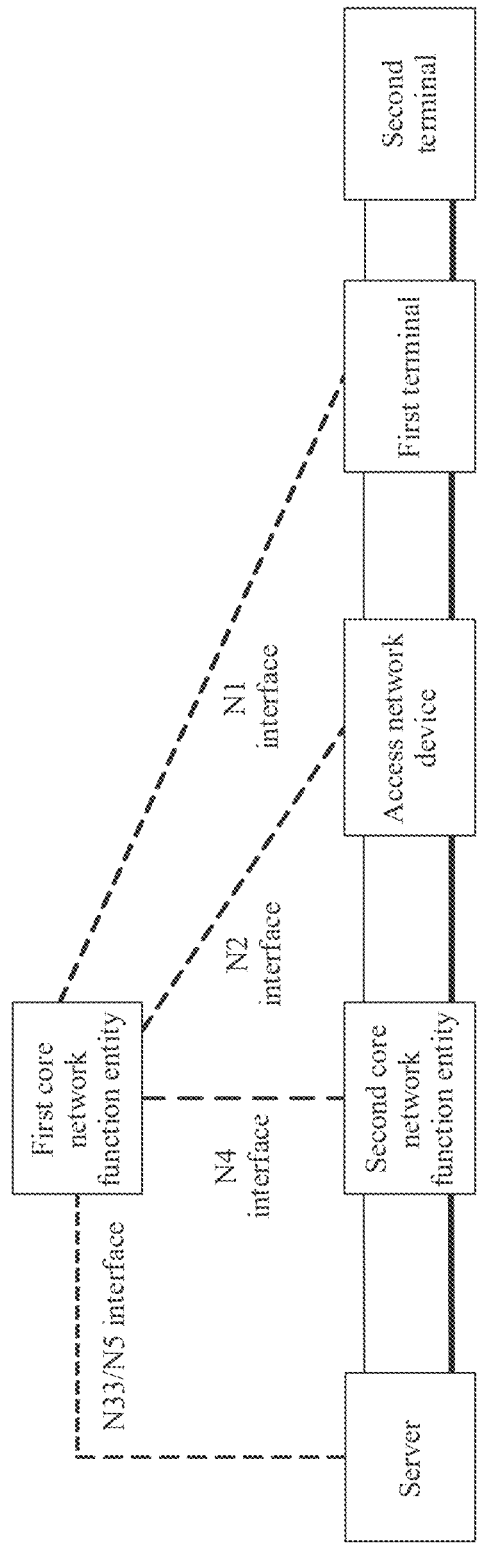
FIG. 6 is a schematic diagram of a D2D transmission scenario according to an embodiment of this application.

FIG. 6 is a schematic diagram of a device-to-device (device-to-device, D2D for short) transmission scenario according to an embodiment of this application. For ease of description, the D2D scenario shown in FIG. 6 is applied to a wireless cellular network. Refer to the architecture shown in FIG. 1. In addition, in scenarios such as Wi-Fi and Bluetooth, a terminal may also perform D2D transmission.

In the scenario shown in FIG. 6, a first terminal may obtain QoS information corresponding to different split data by notifying a first core network function entity that the first terminal has a multi-stream transmission requirement and directly triggering generation and delivery of QoS configuration information. Then, the first terminal may split data to obtain first split data and second split data, and bind an obtained first QoS identifier in first QoS configuration information to the first split data, and binds an obtained second QoS identifier in second QoS configuration information to the second split data, and then the first terminal may send processed first split data and processed second split data through a sidelink air interface in the manner in step S408.

In a Wi-Fi scenario, an access point in a wireless local area network may configure, for the first terminal, QoS configuration information corresponding to multi-stream transmission.

In a scenario in which there is no third-party device, the system may preconfigure, for the first terminal, QoS configuration information corresponding to multi-stream transmission of different services, and send the QoS configuration information to the first terminal for storage locally, or the first terminal directly pre-stores QoS configuration information corresponding to multi-stream transmission of different types of services. Therefore, when the multi-stream transmission needs to be performed, the first terminal may directly invoke the QoS configuration information prestored in the first terminal. For example, for two-stream transmission of an XR service, the first terminal prestores the first QoS configuration information and the second QoS configuration information, and for two-stream transmission of an audio service, the first terminal prestores third QoS configuration information and fourth QoS configuration information. In this way, when the first terminal needs to perform D2D transmission of the XR service with a second terminal, the first terminal may directly invoke the first QoS configuration information and the second QoS configuration information for transmission.

Figure 7:
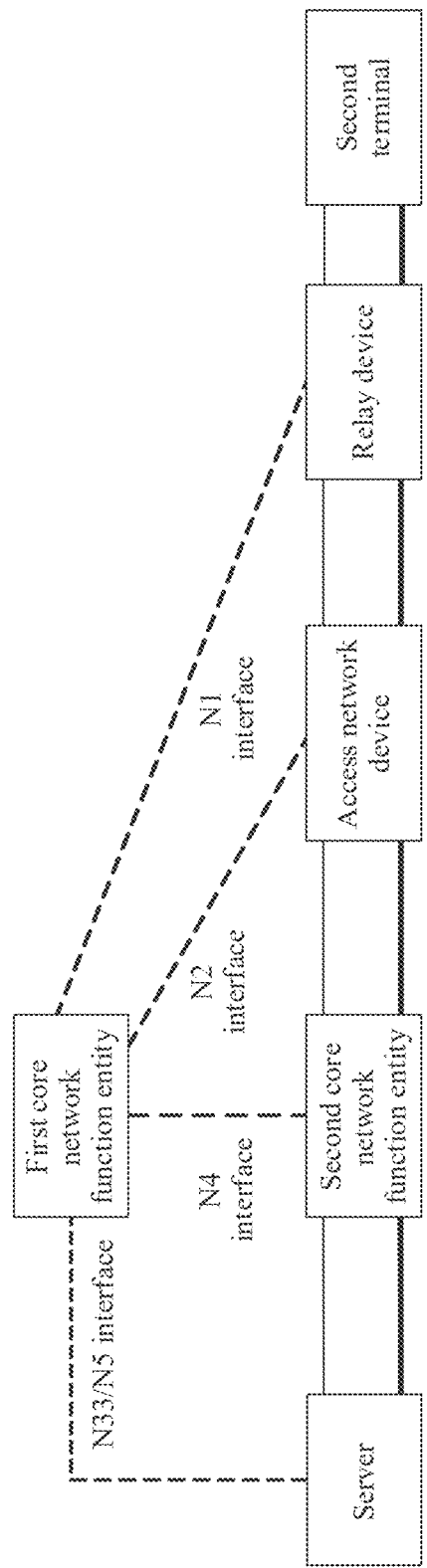
FIG. 7 is a schematic diagram of a relay transmission scenario according to an embodiment of this application.

FIG. 7 is a schematic diagram of a relay transmission scenario according to an embodiment of this application. In comparison with FIG. 6, in the scenario in FIG. 7, a second terminal is located outside signal coverage of an access network device, and cannot directly communicate with the access network device. Therefore, the first terminal in FIG. 6 may be used as the relay device in FIG. 7, and provides a relay transmission function for the second terminal. Certainly, the relay device may be a first terminal, or may be another device that provides a relay transmission function, for example, a small-sized base station such as an integrated backhaul base station. In downlink, the relay device may receive first QoS configuration information and second QoS configuration information that are sent by a first core network function entity, receive first split data and second split data that are sent by the access network device, and send the information and the data to the second terminal. In uplink, the relay device may receive the first QoS configuration information and the second QoS configuration information that are sent by the first core network function entity, and the first split data and the second split data that are sent by the second terminal, and send the data to the access network device.

Figure 8:
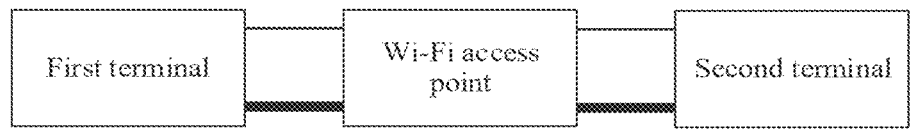
FIG. 8 is a schematic diagram of a Wi-Fi transmission scenario according to an embodiment of this application.

FIG. 8 is a schematic diagram of a Wi-Fi transmission scenario according to an embodiment of this application. A specific application scenario corresponding to FIG. 8 may be projection from a mobile phone, a tablet, a computer, or the like to a television, a smart screen, a tablet, a computer, or the like through an access point such as a router or a set-top box in a wireless local area network.

In this scenario, a Wi-Fi access point may implement functions of the first core network function entity and the second core network function entity in FIG. 1, for example, receive multi-stream transmission information of the first terminal, and configure, for the first terminal, QoS configuration information corresponding to the multi-stream transmission; and some other functions such as generating association information and first/second receiving indication information.

Further, when transmitting data, the first terminal or the Wi-Fi access point may further transmit different split data in a manner in which the access network device sends data in step S408 shown in FIG. 4B. Details are not described herein.

A data transmission procedure is as follows: The first terminal sends the multi-stream transmission information to the Wi-Fi access point. The Wi-Fi access point generates first QoS configuration information and second QoS configuration information and sends the first QoS configuration information and the second QoS configuration information to the first terminal and a second terminal. The first terminal splits service data to obtain first split data and second split data. The first terminal binds a first QoS identifier in first QoS configuration information to the first split data, binds a second QoS identifier in second QoS configuration information to the second split data, and sends processed first split data and processed second split data to the Wi-Fi access point. The Wi-Fi access point sends the processed first split data to the second terminal based on the first QoS configuration information, and sends the processed second split data to the second terminal based on the second QoS configuration information.

It may be understood that the Wi-Fi access point may further flexibly adjust the binding relationship between the QoS configuration information and the split data based on a channel status. For example, when the channel status is good, the binding between the second QoS configuration information and the second split data whose importance is low is deleted, and third QoS configuration information whose QoS guarantee is higher than that of the second QoS configuration information is rebound for the second split data. When the channel status is poor, the binding between the second QoS configuration information and the second split data whose importance is low is deleted, and third QoS configuration information whose QoS guarantee is lower than that of the second QoS configuration information is rebound for the second split data, or transmission of the second split data is directly abandoned. Certainly, a manner of modifying the binding between the QoS configuration information and the split data is also applicable to the first split data of high importance. Details are not described herein again.

According to the foregoing method, multi-stream transmission in a Wi-Fi scenario can be implemented, a projection effect is improved, problems such as frame freezing and artifacts are avoided. This can bring good user experience.

In addition to obtaining the QoS configuration information from the Wi-Fi access point, the first terminal may also prestore corresponding QoS configuration information based on different services. This is not limited in this embodiment of this application.

Figure 9:
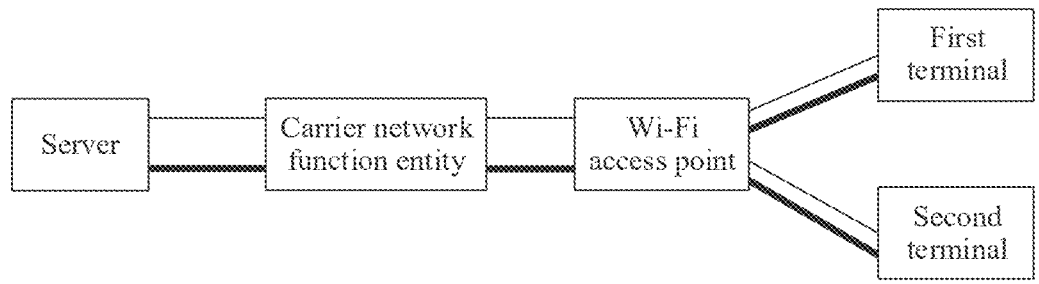
FIG. 9 is a schematic diagram of another Wi-Fi transmission scenario according to an embodiment of this application.

In addition to the foregoing projection usage scenario, the data transmission method in this application may be further applied to a cloud projection usage scenario. FIG. 9 is a schematic diagram of another Wi-Fi transmission scenario according to an embodiment of this application.

A carrier network function entity or the Wi-Fi access point may implement functions of the first core network function entity and the second core network function entity in FIG. 1. For example, a server may send multi-stream transmission information to the carrier network function entity or the Wi-Fi access point, and the carrier network function entity or the Wi-Fi access point generates and delivers QoS configuration information and the like corresponding to the multi-stream transmission.

Further, when transmitting data, the Wi-Fi access point may further transmit different split data in a manner in which the access network device sends data in step S408 shown in FIG. 4B. Details are not described herein.

When generating the QoS configuration information corresponding to the multi-stream transmission, the carrier network function entity sends the QoS configuration information to the Wi-Fi access point. When generating the QoS configuration information corresponding to the multi-stream transmission, the Wi-Fi access point sends the QoS configuration information to the carrier network function entity, to ensure that the split data obtains proper QoS guarantee in a transmission process. After the server splits the service data, the split data is sequentially sent from the server-the carrier network function entity-the Wi-Fi access point to a first terminal and a second terminal, to complete cloud projection of the two devices.

It may be understood that the first terminal and the second terminal may further feed back a channel status to the Wi-Fi access point, and the Wi-Fi access point may flexibly adjust the binding relationship between the QoS configuration information and the split data based on the channel status. Split data transmission may be further flexibly adjusted based on channel statuses between the first terminal and different devices. For example, if a channel status between the first terminal and the Wi-Fi access point is poor, only first split data of higher importance may be transmitted. If a channel status between the second terminal and the Wi-Fi access point is good, the first split data and the second split data may be transmitted. This is not limited in this embodiment of this application.

According to the method in this embodiment of this application, a cloud projection function can be provided for different terminals, to implement a result of displaying a same picture on different terminals. A basic projection effect can be ensured in a multi-stream transmission mode. In addition, split data transmission may be flexibly adjusted for different terminals, and differentiated processing is performed on different terminals, so that each terminal obtains a proper projection effect.

In correspondence to the methods provided in the foregoing method embodiments, embodiments of this application further provide corresponding apparatuses. The apparatuses include corresponding modules configured to perform the foregoing embodiments. The module may be software, hardware, or a combination of software and hardware.

Figure 10:
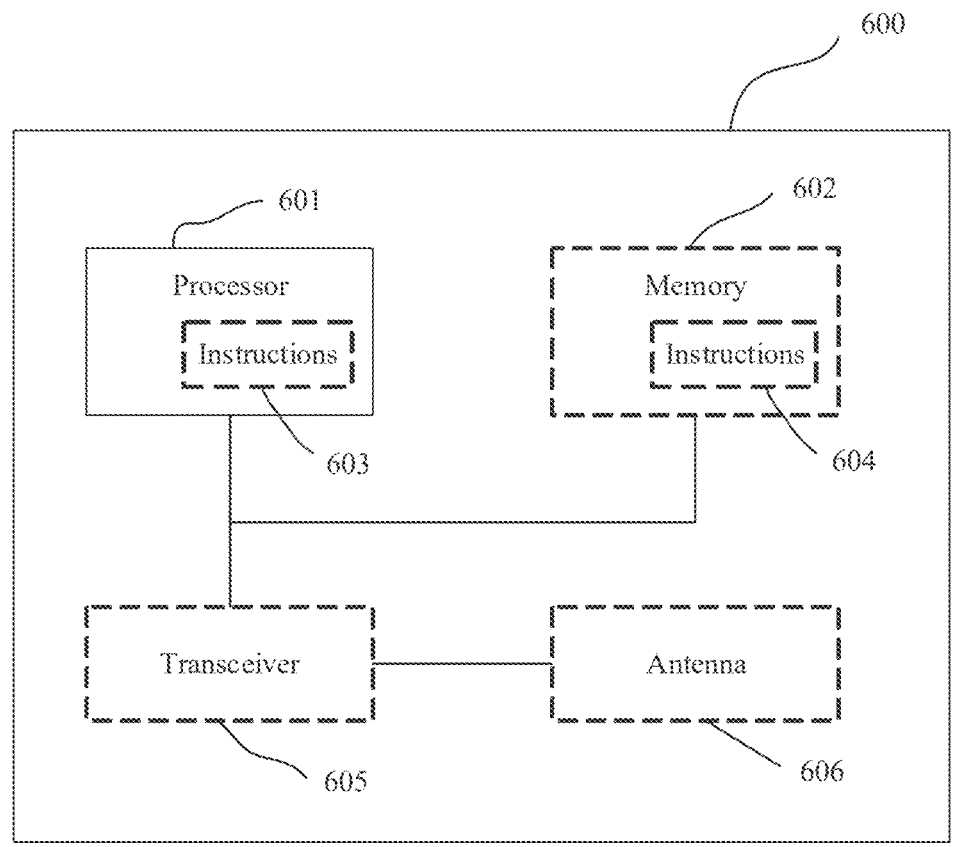
FIG. 10 is a schematic composition diagram of an apparatus according to an embodiment of this application.

FIG. 10 is a schematic diagram of a structure of an apparatus. The apparatus 600 may be a first core network function entity, or may be a second core network function entity, or may be a chip, a chip system, a processor, or the like that supports the first core network function entity in implementing the foregoing method, or may be a chip, a chip system, a processor, or the like that supports the second core network function entity in implementing the foregoing method. The apparatus may be configured to implement the methods described in the foregoing method embodiments. For details, refer to the descriptions in the foregoing method embodiments.

The apparatus 600 may include one or more processors 601. The processor 601 may also be referred to as a processing unit, and may implement a specific control function. The processor 601 may be a general-purpose processor, an application-specific processor, or the like. For example, the processor 1501 may be a baseband processor or a central processing unit. The baseband processor may be configured to process a communication protocol and communication data. The central processing unit may be configured to control a communication apparatus (for example, an NEF, a PCF, an SMF, a UPF, a base station, a baseband chip, a terminal, a terminal chip, a DU, or a CU), execute a software program, and process data of the software program.

In an optional design, the processor 601 may also store instructions and/or data 603. The instructions and/or data 603 may be run by the processor, to enable the apparatus 600 to perform the method described in the foregoing method embodiments.

In another optional design, the processor 601 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, the apparatus 600 may include a circuit. The circuit may implement the sending, receiving, or communication function in the foregoing method embodiments.

Optionally, the apparatus 600 may include one or more memories 602. The memory stores instructions 604, and the instructions may be run on the processor, to enable the apparatus 600 to perform the method described in the foregoing method embodiments. Optionally, the memory may further store data. Optionally, the processor may also store instructions and/or data. The processor and the memory may be separately disposed, or may be integrated together. For example, the correspondence described in the foregoing method embodiment may be stored in the memory or stored in the processor.

Optionally, the apparatus 600 may further include a transceiver 605 and/or an antenna 606. The processor 601 may be referred to as a processing unit, and controls the apparatus 600. The transceiver 605 may be referred to as a transceiver unit, a transceiver machine, a transceiver circuit, a transceiver apparatus, a transceiver module, or the like, and is configured to implement a transceiver function.

Optionally, the apparatus 600 in this embodiment of this application may be configured to perform the method described in FIG. 2, FIG. 3, FIG. 4A and FIG. 4B, or FIG. 5 in embodiments of this application, or may be configured to perform a method in which the methods described in the foregoing two or more figures are combined.

The processor and the transceiver in this application may be implemented in an integrated circuit (integrated circuit. IC for short), an analog IC, a radio frequency integrated circuit RFIC, a mixed signal IC, an application-specific integrated circuit (application-specific integrated circuit, ASIC for short), a printed circuit board (printed circuit board, PCB for short), an electronic device, or the like. The processor and the transceiver may also be fabricated by using various IC process technologies, for example, a complementary metal oxide semiconductor (complementary metal oxide semiconductor, CMOS for short), an n-type metal oxide semiconductor (n-type metal oxide semiconductor, NMOS for short), a p-type metal oxide semiconductor (p-type metal oxide semiconductor, PMOS for short), a bipolar junction transistor (Bipolar Junction Transistor, BJT for short), a bipolar CMOS (BiCMOS), silicon germanium (SiGe), and gallium arsenide (GaAs).

The apparatus described in the foregoing embodiments may be the first core network function entity or the second core network function entity. However, a scope of the apparatus described in this application is not limited thereto, and a structure of the apparatus may not be limited by FIG. 6. The apparatus may be an independent device, or may be a part of a larger device. For example, the apparatus may be:

(1) an independent integrated circuit IC, a chip, or a chip system or subsystem;

(2) a set of one or more ICs, where optionally, the IC set may also include a storage component configured to store data and/or instructions;

(3) an ASIC, for example, a modem (MSM);

(4) a module that can be embedded in another device;

(5) a, core network device, a receiver, a terminal, an intelligent terminal, a cellular phone, a wireless device, a handheld device, a mobile unit, a vehicular device, a network device, a cloud device, an artificial intelligence device, a machine device, a home device, a medical device, an industrial device, and the like; or (6) another device or the like.

Figure 11:
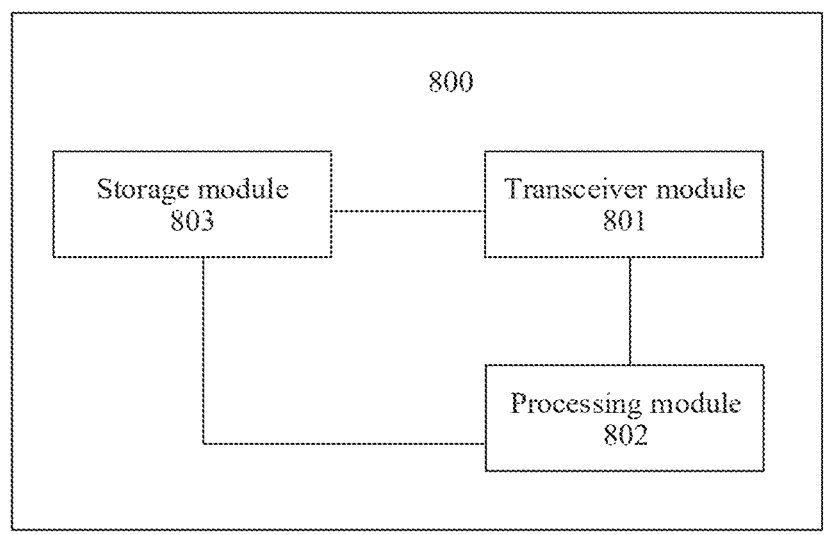
FIG. 11 is a schematic composition diagram of another apparatus according to an embodiment of this application.

As shown in FIG. 11, another embodiment of this application provides an apparatus 800. The apparatus may be a first core network function entity, or may be a component (for example, an integrated circuit or a chip) of the first core network function entity. Alternatively, the apparatus may be a second core network function entity, or may be a component (for example, an integrated circuit or a chip) of the second core network function entity. Alternatively, the apparatus may be another communication module configured to implement the method in the method embodiments of this application. The apparatus 800 may include a processing module 802 (or referred to as a processing unit). Optionally, the apparatus 800 may further include a transceiver module 801 (or referred to as a transceiver unit) and a storage module 803 (or referred to as a storage unit).

In a possible design, one or more modules in FIG. 11 may be implemented by one or more processors, may be implemented by one or more processors and memories, may be implemented by one or more processors and transceivers, or may be implemented by one or more processors, memories, and transceivers. This is not limited in this embodiment of this application. The processor, the memory, and the transceiver may be disposed separately, or may be integrated.

The apparatus has a function of implementing the first core network function entity described in embodiments of this application. For example, the apparatus includes a corresponding module, unit, or means (means) used for the first core network function entity to perform the steps related to the first core network function entity and that are described in embodiments of this application. The function, the unit, or the means (means) may be implemented by software or hardware, may be implemented by hardware executing corresponding software, or may be implemented by a combination of software and hardware. For details, refer to the corresponding descriptions in the foregoing corresponding method embodiment. Alternatively, the apparatus has a function of implementing the second core network function entity described in embodiments of this application. For example, the apparatus includes a corresponding module, unit, or means (means) used for the second core network function entity to perform the steps related to the second core network function entity and that are described in embodiments of this application. The function, the unit, or the means (means) may be implemented by software or hardware, may be implemented by hardware executing corresponding software, or may be implemented by a combination of software and hardware. For details, refer to the corresponding descriptions in the foregoing corresponding method embodiment.

Optionally, the modules in the apparatus 800 in this embodiment of this application may be configured to perform the method described in FIG. 2, FIG. 3, FIG. 4A and FIG. 4B, or FIG. 5 in embodiments of this application, or may be configured to perform a method in which the methods described in the foregoing two or more figures are combined.

In a possible design, an apparatus 800 may include a transceiver module 801, a processing module 802, and a storage module 803. The storage module 803 is configured to store data and store program code executed by the processing module 802.

The transceiver module 801 is configured to receive multi-stream transmission information of a service, where the multi-stream transmission information indicates that the service is transmitted via first split data and second split data.

The processing module 802 is configured to generate first QoS configuration information and second QoS configuration information based on the multi-stream transmission information, where the first QoS configuration information corresponds to the first split data, and the second QoS configuration information corresponds to the second split data.

The transceiver module 801 is further configured to output the first QoS configuration information and the second QoS configuration information.

Optionally, the processing module 802 is further configured to:
generate association information, where the association information indicates that the first split data and the second split data are associated with the service.

The transceiver module 801 is further configured to output the association information.

Optionally, the processing module 802 is further configured to:
generate first receiving indication information, where the first receiving indication information indicates a sequence of receiving the first split data and the second split data.

The transceiver module 801 is further configured to output the first receiving indication information.

Optionally, the processing module 802 is further configured to: generate second receiving indication information, where the second receiving indication information indicates to ignore the first split data and/or the second split data.

The transceiver module 801 is further configured to output the second receiving indication information.

Optionally, the first split data is data within an FOV, and the second split data is data outside the FOV.

Optionally, the first split data is base layer data, and the second split data is enhancement layer data.

Optionally, the first QoS configuration information includes latency parameter information and/or packet loss rate parameter information, and the second QoS configuration information includes latency range parameter information and/or packet loss rate range parameter information.

For a concept, explanation, detailed description, and other steps that are related to the apparatus 800 and the technical solution provided in this embodiment of this application, refer to descriptions about the content related to the first core network function entity in the foregoing method or in another embodiment. Details are not described herein again.

In another possible design, the storage module 803 is configured to store data and store program code executed by the processing module 802.

The transceiver module 801 is configured to obtain first QoS configuration information, second QoS configuration information, first split data, and second split data.

The processing module 802 is configured to process the first split data based on the first QoS configuration information, and process the second split data based on the second QoS configuration information.

The transceiver module 801 is further configured to output processed first split data and processed second split data.

Optionally, the processing module 802 is specifically configured to:
bind a first QoS identifier in the first QoS configuration information to the first split data; and
bind a second QoS identifier in the second QoS configuration information to the second split data.

Optionally, the first split data is data within an FOV, and the second split data is data outside the FOV.

Optionally, the first split data is base layer data, and the second split data is enhancement layer data.

Optionally, the first QoS configuration information includes latency parameter information and/or packet loss rate parameter information, and the second QoS configuration information includes latency range parameter information and/or packet loss rate range parameter information.

For a concept, explanation, detailed description, and other steps that are related to the apparatus and the technical solution provided in this embodiment of this application, refer to descriptions about the content related to the second core network function entity in the foregoing method or in another embodiment. Details are not described herein again.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

A person skilled in the art may further understand that various illustrative logical blocks (illustrative logical blocks) and steps (steps) that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the functions for corresponding application, but it should not be considered that the implementation goes beyond the scope of embodiments of this application.

It may be understood that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general purpose processor, a digital signal processor (digital signal processor, DSP for short), an application-specific integrated circuit (application-specific integrated circuit. ASIC for short), a field programmable gate array (field programmable gate array. FPGA for short) or another programmable logic device, a discrete gate or transistor logic device, or a discrete hardware component.

The solutions described in this application may be implemented in various manners. For example, the technologies may be implemented by hardware, software, or a combination thereof. For hardware implementation, a processing unit configured to perform these technologies at a communication apparatus (for example, a base station, a terminal, a network entity, or a chip) may be implemented in one or more general-purpose processors, a DSP, a digital signal processor, an ASIC, a programmable logic device, an FPGA or another programmable logic apparatus, a discrete gate or transistor logic device, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

It may be understood that the memory in this embodiment of this application may be a transitory memory or a non-transitory memory, or may include a transitory memory and a non-transitory memory. The non-transitory memory may be a read-only memory (read-only memory. ROM for short), a programmable read-only memory (programmable ROM, PROM for short), an erasable programmable read-only memory (erasable PROM, EPROM for short), an electrically erasable programmable read-only memory (electrically EPROM, EEPROM for short), or a flash memory. The transitory memory may be a random access memory (random access memory, RAM for short), used as an external cache. For example but not for limitative description, many forms of RAMs may be used, for example, a static random access memory (static RAM, SRAM for short), a dynamic random access memory (dynamic RAM, DRAM for short), a synchronous dynamic random access memory (synchronous DRAM, SDRAM for short), a double data rate synchronous dynamic random access memory (double data rate SDRAM, DDR SDRAM for short), an enhanced synchronous dynamic random access memory (enhanced SDRAM, ESDRAM for short), a synchlink dynamic random access memory (synchlink DRAM, SLDRAM for short), and a direct rambus random access memory (direct rambus RAM, DR RAM for short). It should be noted that the memory of the systems and methods described in this specification includes but is not limited to these and any memory of another proper type.

This application further provides a computer-readable medium storing a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, including one or more usable media. The usable medium may be a magnetic medium (for example, a floppy disk, a hard disk drive, or a magnetic tape), an optical medium (for example, a high-density digital video disc (digital video disc, DVD)), a semiconductor medium (for example, a solid-state drive (solid-state drive, SSD)), or the like.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments by using any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, but do not constitute a limitation on time, do not require that the apparatus have a determining action during implementation, and do not mean any other limitation.

"Simultaneously" in this application may be understood as being at a same time point, may be understood as being within a time period, or may be understood as being within a same periodicity.

A person skilled in the art may understand that first, second, and various reference numerals in this application are for distinguishing only for ease of description, and are not used to limit the scope of embodiments of this application. A specific value of a numeral (which may also be referred to as an index), a specific value of a quantity, and a position in this application are only used as an example, but are not unique representation forms, and are not used to limit the scope of embodiments of this application. First, second, and various reference numerals in this application are also for distinguishing only for ease of description, and are not used to limit the scope of embodiments of this application.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural. The character "/" generally indicates an "or" relationship between the associated objects.

The term "at least one of" in this specification indicates all or any combination of listed items. For example, "at least one of A. B. and C" may indicate the following six cases: Only A exists, only B exists, only C exists, both A and B exist, both B and C exist, and A, B, and C exist. A may be singular or plural, B may be singular or plural, and C may be singular or plural.

It may be understood that, in embodiments of this application, "B corresponding to A" indicates that B is associated with A, and B may be determined based on A. However, it should be further understood that determining B based on A does not mean that B is determined based only on A. B may alternatively be determined based on A and/or other information.

The correspondences shown in the tables in this application may be configured, or may be predefined. Values of the information in the tables are only examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that, for a purpose of convenient and brief descriptions, for a detailed working process of the foregoing system, apparatus, and unit, refer to a corresponding process in the foregoing method embodiments. Details are not described herein again.

It may be understood that the system, apparatus, and method described in this application may alternatively be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An apparatus, comprising:
one or more processors; and
a memory having instructions stored thereon that, when executed by the one or more processors, cause the apparatus to:
receive multi-stream transmission information of a service for a same terminal, wherein the multi-stream transmission information indicates that the service for the same terminal is transmitted via first split data and second split data;
generate first quality of service (QOS) configuration information and second QoS configuration information based on the multi-stream transmission information, wherein the first QoS configuration information corresponds to the first split data, and the second QoS configuration information corresponds to the second split data; and
output the first QoS configuration information and the second QoS configuration information, wherein at least one of the following conditions is satisfied:
the first split data is data within a field of view (FOV), and the second split data is data outside the FOV;
the first split data is base layer data, and the second split data is enhancement layer data;
the first split data is I frame data, I slice data, or I tile data generated during video encoding, and the second split data is P frame data, P slice data, or P tile data generated during corresponding video encoding respectively;
the first split data is 360-degree background stream data, and the second split data is foreground stream data within a FOV;
the first split data is voice data, and the second split data is video data;
the first split data is action data or control information data, and the second split data is picture data, video data, or voice data;
the first split data is left-eye video data, and the second split data is right-eye video data; or
the first split data is rendering metadata, and the second split data is video data.

2. The apparatus according to claim 1, wherein the apparatus is further caused to:
generate association information, wherein the association information indicates that the first split data and the second split data are associated with the service; and
output the association information.

3. The apparatus according to claim 1, wherein the apparatus is further caused to:
generate first receiving indication information, wherein the first receiving indication information indicates a sequence of receiving the first split data and the second split data; and
output the first receiving indication information.

4. The apparatus according to claim 1, wherein the apparatus is further caused to:
generate second receiving indication information, wherein the second receiving indication information indicates to ignore at least one of the first split data or the second split data; and
output the second receiving indication information.

5. The apparatus according to claim 1, wherein the first QoS configuration information comprises at least one of latency parameter information or packet loss rate parameter information, and the second QoS configuration information comprises at least one of latency range parameter information or packet loss rate range parameter information.

6. An apparatus, comprising:
one or more processors; and
a memory having instructions stored thereon that, when executed by the one or more processors, cause the apparatus to:
obtain first quality of service (QOS) configuration information, second QoS configuration information, first split data, and second split data, wherein the first split data and the second split data are from a service for a same terminal;
process the first split data based on the first QoS configuration information;
process the second split data based on the second QoS configuration information; and
output the processed first split data and the processed second split data, wherein at least one of the following conditions is satisfied:
the first split data is data within a field of view (FOV), and the second split data is data outside the FOV;
the first split data is base layer data, and the second split data is enhancement layer data;
the first split data is I frame data, I slice data, or I tile data generated during video encoding, and the second split data is P frame data, P slice data, or P tile data generated during corresponding video encoding respectively;
the first split data is 360-degree background stream data, and the second split data is foreground stream data within a FOV;
the first split data is voice data, and the second split data is video data;
the first split data is action data or control information data, and the second split data is picture data, video data, or voice data;
the first split data is left-eye video data, and the second split data is right-eye video data; or
the first split data is rendering metadata, and the second split data is video data.

7. The apparatus according to claim 6, wherein:
processing the first split data based on the first QoS configuration information comprises binding a first QoS identifier in the first QoS configuration information to the first split data; and processing the second split data based on the second QoS configuration information comprises binding a second QoS identifier in the second QoS configuration information to the second split data.

8. The apparatus according to claim 6, wherein the first QoS configuration information comprises at least one of latency parameter information or packet loss rate parameter information, and the second QoS configuration information comprises at least one of latency range parameter information or packet loss rate range parameter information.

9. A data transmission method, comprising:
receiving, by a first core network function entity, multi-stream transmission information of a service for a same terminal, wherein the multi-stream transmission information indicates that the service for the same terminal is transmitted via first split data and second split data;
generating, by the first core network function entity, first quality of service (QOS) configuration information and second QoS configuration information based on the multi-stream transmission information, wherein the first QoS configuration information corresponds to the first split data, and the second QoS configuration information corresponds to the second split data; and outputting, by the first core network function entity, the first QoS configuration information and the second QoS configuration information, wherein at least one of the following conditions is satisfied:

the first split data is data within a field of view (FOV), and the second split data is data outside the FOV;

the first split data is base layer data, and the second split data is enhancement layer data;

the first split data is I frame data, I slice data, or I tile data generated during video encoding, and the second split data is P frame data, P slice data, or P tile data generated during corresponding video encoding respectively;

the first split data is 360-degree background stream data, and the second split data is foreground stream data within a FOV;

the first split data is voice data, and the second split data is video data;

the first split data is action data or control information data, and the second split data is picture data, video data, or voice data;

the first split data is left-eye video data, and the second split data is right-eye video data; or the first split data is rendering metadata, and the second split data is video data.

10. The method according to claim 9, wherein the method further comprises:

generating, by the first core network function entity, association information, wherein the association information indicates that the first split data and the second split data are associated with the service; and outputting, by the first core network function entity, the association information.

11. The method according to claim 9, wherein the method further comprises:

generating, by the first core network function entity, first receiving indication information, wherein the first receiving indication information indicates a sequence of receiving the first split data and the second split data; and outputting, by the first core network function entity, the first receiving indication information.

12. The method according to claim 9, wherein the method further comprises:

generating, by the first core network function entity, second receiving indication information, wherein the second receiving indication information indicates to ignore at least one of the first split data or the second split data; and outputting, by the first core network function entity, the second receiving indication information.

13. The method according to claim 9, wherein the first QoS configuration information comprises at least one of latency parameter information or packet loss rate parameter information, and the second QoS configuration information comprises at least one of latency range parameter information or packet loss rate range parameter information.

14. A data transmission method, comprising:

obtaining, by a second core network function entity, first quality of service (QOS) configuration information, second QoS configuration information, first split data, and second split data, wherein the first split data and the second split data are from a service for a same terminal;

processing, by the second core network function entity, the first split data based on the first QoS configuration information;

processing the second split data based on the second QoS configuration information; and outputting, by the second core network function entity, the processed first split data and the processed second split data, wherein at least one of the following conditions is satisfied:

the first split data is data within a field of view (FOV), and the second split data is data outside the FOV;

the first split data is base layer data, and the second split data is enhancement layer data;

the first split data is I frame data, I slice data, or I tile data generated during video encoding, and the second split data is P frame data, P slice data, or P tile data generated during corresponding video encoding respectively;

the first split data is 360-degree background stream data, and the second split data is foreground stream data within a FOV;

the first split data is voice data, and the second split data is video data;

the first split data is action data or control information data, and the second split data is picture data, video data, or voice data;

the first split data is left-eye video data, and the second split data is right-eye video data; or the first split data is rendering metadata, and the second split data is video data.

15. The method according to claim 14, wherein:

the processing, by the second core network function entity, the first split data based on the first QoS configuration information comprises binding, by the second core network function entity, a first QoS identifier in the first QoS configuration information to the first split data; and the processing, by the second core network function entity, the second split data based on the second QoS configuration information comprises binding, by the second core network function entity, a second QoS identifier in the second QoS configuration information to the second split data.

16. The method according to claim 14, wherein the first QoS configuration information comprises at least one of latency parameter information or packet loss rate parameter information, and the second QoS configuration information comprises at least one of latency range parameter information or packet loss rate range parameter information.

* * * * *